United States Patent
Yoshida et al.

(10) Patent No.: US 10,344,363 B2
(45) Date of Patent: Jul. 9, 2019

(54) HOT-ROLLED STEEL AND STEEL COMPONENT

(71) Applicant: NIPPON STEEL & SUMITOMO METAL CORPORATION, Tokyo (JP)

(72) Inventors: Suguru Yoshida, Hokkaido (JP); Shinya Teramoto, Hokkaido (JP); Akira Shiga, Hokkaido (JP); Manabu Kubota, Nishinomiya (JP); Hajime Hasegawa, Hokkaido (JP); Hideo Mizukami, Kashima (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/766,764

(22) PCT Filed: Oct. 19, 2016

(86) PCT No.: PCT/JP2016/080984
§ 371 (c)(1),
(2) Date: Apr. 6, 2018

(87) PCT Pub. No.: WO2017/069161
PCT Pub. Date: Apr. 27, 2017

(65) Prior Publication Data
US 2018/0291485 A1    Oct. 11, 2018

(30) Foreign Application Priority Data
Oct. 19, 2015   (JP) ................................. 2015-205436

(51) Int. Cl.
*C22C 38/60*   (2006.01)
*C22C 38/02*   (2006.01)
(Continued)

(52) U.S. Cl.
CPC ............ *C22C 38/60* (2013.01); *C21D 8/0226* (2013.01); *C22C 38/00* (2013.01); *C22C 38/001* (2013.01);
(Continued)

(58) Field of Classification Search
CPC ................................ C22C 38/02; C22C 38/60
(Continued)

(56) References Cited

U.S. PATENT DOCUMENTS

2009/0047169 A1    2/2009 Anan et al.
2010/0266439 A1*  10/2010 Matsugasako .......... C22C 38/02
                                                                   420/83

FOREIGN PATENT DOCUMENTS

EP           1 264 909 A1    12/2002
JP             11029842    *  2/1999
(Continued)

OTHER PUBLICATIONS

English language machine translation of JP 11029842 to Kamata et al. Generated Sep. 3, 2018. (Year: 2018).*
(Continued)

*Primary Examiner* — Brian D Walck
(74) *Attorney, Agent, or Firm* — Birch, Stewart, Kolasch & Birch, LLP

(57) ABSTRACT

There is a hot-rolled steel according to one aspect of the invention including predetermined chemical compositions including 0.0001 to 0.0050 mass % of Bi, in which 90 area % or more of a metallographic structure is configured with a ferrite and a pearlite, and an average number density of Mn sulfides extending along a rolling direction and having an aspect ratio exceeding 10 and equal to or smaller than 30, which is measured on a cross section parallel to the rolling direction, is 50 to 200 number/mm$^2$.

6 Claims, 2 Drawing Sheets

(51) Int. Cl.
  *C22C 38/00* (2006.01)
  *C21D 8/02* (2006.01)
  *C22C 38/04* (2006.01)
  *C22C 38/24* (2006.01)
  *C22C 38/26* (2006.01)
  *C22C 38/28* (2006.01)
  *C21D 8/00* (2006.01)

(52) U.S. Cl.
  CPC .......... *C22C 38/002* (2013.01); *C22C 38/005* (2013.01); *C22C 38/02* (2013.01); *C22C 38/04* (2013.01); *C22C 38/24* (2013.01); *C22C 38/26* (2013.01); *C22C 38/28* (2013.01); C21D 8/00 (2013.01); C21D 2211/005 (2013.01); C21D 2211/009 (2013.01)

(58) Field of Classification Search
  USPC .................................................. 148/320, 331
  See application file for complete search history.

(56) References Cited

FOREIGN PATENT DOCUMENTS

| JP | 2000-73141 A | 3/2000 |
|---|---|---|
| JP | 3355132 B2 | 12/2002 |
| JP | 2005-054228 A | 3/2005 |
| JP | 3637375 B2 | 4/2005 |
| JP | 3671688 B2 | 7/2005 |
| JP | 2006-052432 A | 2/2006 |
| JP | 3756307 B2 | 3/2006 |
| JP | 2007-277705 A | 10/2007 |
| JP | 3988661 B2 | 10/2007 |
| JP | 4268194 B2 | 5/2009 |
| JP | 2009-155724 A | 7/2009 |
| JP | 4314851 B2 | 8/2009 |
| JP | 2010-077488 A | 4/2010 |
| JP | 5522321 B1 | 6/2014 |
| RU | 2326179 C2 | 6/2008 |

OTHER PUBLICATIONS

International Search Report for PCT/JP2016/080984 (PCT/ISA/210) dated Jan. 17, 2017.
Written Opinion of the International Searching Authority for PCT/JP2016/080984 (PCT/ISA/237) dated Jan. 17, 2017.
Russian Notice of Allowance and Search Report for Russian Application No. 2018113273/02, dated Jan. 14, 2019, with English translation.
European Patent Office Search Report dated Apr. 2, 2019 for counterpart EP application No. 16857474.7.

* cited by examiner

HOT-ROLLED STEEL AND STEEL COMPONENT

TECHNICAL FIELD OF THE INVENTION

The present invention relates to a hot-rolled steel.

Priority is claimed on Japanese Patent Application No. 2015-205436, filed Oct. 19, 2015, the content of which is incorporated herein by reference.

RELATED ART

Components for an engine and components for a suspension system of a vehicle are obtained by forming steel by hot forging, and arbitrarily heat treating (hereinafter, referred to as thermal refining) such as quenching and tempering the steel. A component subjected to the thermal refining is referred to as a heat-treated component, and a component not subjected to the thermal refining is referred to as non-heat treated component. In both cases, mechanical characteristics necessary for a component to be used are ensured. Recently, from a viewpoint of economic efficiency of a manufacturing, components obtained by omitting the thermal refining, that is, the non-heat treated components are widely used.

As an example of the component for a vehicle engine, a connecting rod (hereinafter, referred to as a conrod) is used. This component is a component which transmits power when converting a piston reciprocating motion into a rotation motion performed by a crankshaft in an engine. The conrod is configured with a cap portion and a rod portion, the conrod is assembled with the crankshaft by fastening an eccentric portion of the crankshaft which is called a pin portion to be interposed between the cap portion and the rod portion, and accordingly, the power is transmitted by a mechanism of rotating and sliding along the pin portion.

In order to improve consistency of the cap portion and the rod portion, it is necessary to smooth mating surfaces of the cap portion and the rod portion, when manufacturing a typical conrod. In addition, when fastening the pin portion to be interposed between the cap portion and the rod portion, it is necessary to position the cap portion and the rod portion. Thus, when manufacturing a typical conrod, it is necessary to provide recesses and protrusions for positioning on the mating surfaces of the cap portion and the rod portion. Machining for smoothing the mating surfaces and for providing recesses and protrusions on the mating surfaces causes an increase in a manufacturing time and a manufacturing cost of a conrod. In order to omit the machining for providing recesses and protrusions, recently, a fracture-split type conrod is widely used.

The fracture-split type conrod is a component obtained by a method of forming steel in a shape in which a cap portion and a rod portion are integrated by hot forging and the like, providing a notch on a portion corresponding to a boundary between the cap portion and the rod portion, and fracturing and splitting. The mating surfaces of the cap portion and the rod portion obtained by this method are fracture surfaces having recesses and protrusions, obtained by the fracture and split. By fitting the fracture-split fracture surfaces, it is possible to perform the positioning when assembling the conrod with the crankshaft. Thus, in the manufacturing of the fracture-split type conrod, it is possible to omit both a machining for increasing consistency of the mating surfaces and a machining for providing recesses and protrusions for positioning on the mating surfaces. Therefore, regarding the fracture-split type conrod, it is possible to significantly decrease the number of machining components and to significantly improve economic efficiency at the time of manufacturing components.

C70S6 produced in compliance with DIN is spread in Europe and America as a steel used for the fracture-split type conrod. C70S6 is high carbon non-heat treated steel including C content of 0.7 mass %, and a metallographic structure thereof is formed of a pearlite structure having low ductility and toughness, in order to prevent a dimensional change at the time of the fracture and split. C70S6 has a small amount of plastic deformation in the vicinity of a fracture surface at the time of the fracture, and thus, excellent fracture-split properties are obtained. The fracture-split properties of steel are an index of evaluating fitting properties between fracture surfaces of steel obtained by performing the fracturing with respect to the steel. It is determined that steel having a small distortion amount in the vicinity of the fracture surfaces, a large brittle fracture area ratio of the fracture surface, and a small amount of chips generated at the time of the fracturing, has excellent fracture-split properties. However, since the structure of C70S6 is coarse compared to a ferrite-pearlite structure of medium carbon non-heat treated steel which is typical steel for a conrod, a yield ratio (yield strength/tensile strength) is low, and thus, C70S6 cannot be applied to a high-strength conrod in which a high buckling strength is required.

In order to increase the yield ratio of steel, it is necessary that the carbon content of steel is controlled to be low and a ferrite fraction of steel is increased. However, in a case where the ferrite fraction of steel is increased, the ductility of steel is improved and the amount of plastic deformation in the vicinity of a fracture surface at the time of the fracture and split is increased. Accordingly, problems of parts performance occurs, in which the distortion amount of a conrod sliding portion fastened to a pin portion of a crankshaft is increased, and a circularity is decreased.

In addition, due to an increase in engine output due to the spread of high-power diesel engines or turbo engines, there is a need for prevention of displacement of a cap portion and a rod portion of a conrod, that is, a need for the improvement of fitting properties, improvement of a fastening force, and the like. Among these, the improvement of fitting properties is effectively performed by controlling a structure of a steel so that recesses and protrusions on fracture-split surfaces (fracture surfaces) have an increased size.

Some non-heat treated steels have been proposed as a steel suitable for a fracture-split type conrod having high strength. Patent Documents 1 and 2 disclose a technology of improving fracture-split properties by adding a large amount of embrittlement element such as Si or P so as to decrease ductility and toughness of the material. Patent Documents 3 and 4 disclose a technology of decreasing ductility and toughness of a ferrite by using precipitation strengthening of second phase particles, to improve fracture-split properties. In addition, Patent Documents 5 to 7 disclose a technology of controlling the shape of Mn sulfide in steel to improve the fracture-split properties.

In these technologies, the distortion amount of the fracture-split parts is decreased, but materials become brittle. Accordingly, in the steel obtained by these technologies, chips are generated at the time of fracture and split or when fitting fracture surfaces to each other. When chips of the fracture surfaces are generated, a position displacement of a fitting portion occurs, and thus, the fitting cannot be performed with excellent accuracy. Particularly, if the sizes of the recesses and the protrusions on the fracture surfaces are increased, a frequency of generation of chips or cracks at the time of fracture is increased. Therefore, steel which can satisfy both an increase in size of recesses and protrusions of the fracture surfaces and prevention of generation of chips and cracks, at the time of fracture at the same time had been required. As a solution to the prevention of generation of chips and cracks, a technology of reducing segregation of V as disclosed in Patent Document 8. V is a chemical composition added for achieving high-strengthening.

However, there are still reasons of generation of chips and cracks, in addition to the segregation of V. In practice, in a case where the sizes of the recesses and the protrusions of the fracture surfaces are excessively increased, the frequency of generation of chips and cracks tends to be increased. This is because, when recesses and protrusions of fracture surfaces in a tensile direction are formed, cracks or recesses growing in a fracture surface direction are also formed. It is considered that, when fitting fracture surfaces to each other and applying stress to the fracture surfaces for fastening the fracture surfaces on each other, the cracks or recesses grown in the fracture surface direction may become a stress concentration portion, and small fracture may occur in this portion. Meanwhile, in order to increase fitting properties between the fracture surfaces, it is necessary that the sizes of the recesses and the protrusions of the fracture surfaces are increased. As described above, the improvement of fitting properties by increasing the sizes of the recesses and the protrusions of the fracture surfaces and the prevention of generation of chips and cracks are in a relationship contradicting each other, and satisfying both effects was not achieved by methods currently used.

In addition, when the conrod is manufactured, cutting machinability for piercing with drill, and the like is important. Improving cutting machinability improves work efficiency, and large economic effect can be obtained by improving productivity. That is, in the fracture-split conrod, it is necessary to improve cutting machinability without deteriorating any mechanical properties.

PRIOR ART DOCUMENTS

Patent Documents

[Patent Document 1] Japanese Patent No. 3637375
[Patent Document 2] Japanese Patent No. 3756307
[Patent Document 3] Japanese Patent No. 3355132
[Patent Document 4] Japanese Patent No. 3988661
[Patent Document 5] Japanese Patent No. 4314851
[Patent Document 6] Japanese Patent No. 3671688
[Patent Document 7] Japanese Patent No. 4268194
[Patent Document 8] Japanese Patent No. 5522321

DISCLOSURE OF THE INVENTION

Problems to be Solved by the Invention

The invention is made in view of such circumstances, and an object of the invention is to provide a hot-rolled steel and a steel component, in which the distortion amount in the vicinity of a fracture surface at the time of the fracture and split is small, the sizes of recesses and protrusions on the fracture surfaces are increased to increase fitting properties, the amount of chips generated on the fracture surfaces is limited, and the cutting machinability is excellent.

Means for Solving the Problem

The gist of the invention is as follows.

(1) According to an aspect of the invention, there is provided a hot-rolled steel material, in which a chemical composition includes C: 0.35 to 0.45 mass %, Si: 0.6 to 1.0 mass %, Mn: 0.60 to 0.90 mass %, P: 0.010 to 0.035 mass %, S: 0.06 to 0.10 mass %, Cr: 0.25 mass % or less, V: 0.20 to 0.40 mass %, Zr: 0.0002 to 0.0050 mass %, N: 0.0060 to 0.0150 mass %, Bi: 0.0001 to 0.0050 mass %, Ti: 0 to 0.050 mass %, Nb: 0 to 0.030 mass %, Mg: 0 to 0.0050 mass %, REM: 0 to 0.0010 mass %, and a remainder including iron and impurities, 90 area % or more of a metallographic structure is configured with a ferrite and a pearlite, and an average number density of Mn sulfides having an equivalent circle diameter of 1 to 5 µm, extending along a rolling direction, and having an aspect ratio exceeding 10 and equal to or smaller than 30, which is measured on a cross section parallel to the rolling direction, is 50 to 200 number/mm$^2$.

(2) In the hot-rolled steel according to (1) described above, the chemical composition may include one or more elements selected from the group consisting of Ti: 0.005 to 0.050 mass %, Nb: 0.005 to 0.030 mass %, Mg: 0.0005 to 0.0050 mass %, and REM: 0.0003 to 0.0010 mass %.

(3) According to another aspect of the invention, there is provided a steel component, in which a chemical composition includes C: 0.35 to 0.45 mass %, Si: 0.6 to 1.0 mass %, Mn: 0.60 to 0.90 mass %, P: 0.010 to 0.035 mass %, S: 0.06 to 0.10 mass %, Cr: 0.25 mass % or less, V: 0.20 to 0.40 mass %, Zr: 0.0002 to 0.0050 mass %, N: 0.0060 to 0.0150 mass %, Bi: 0.0001 to 0.0050 mass %, Ti: 0 to 0.050 mass %, Nb: 0 to 0.030 mass %, Mg: 0 to 0.0050 mass %, REM: 0 to 0.0010 mass %, and a remainder including iron and impurities, 90 area % or more of a metallographic structure is configured with a ferrite and a pearlite, and an average number density of Mn sulfides having an equivalent circle diameter of 1 to 5 µm, extending along a rolling direction, having an aspect ratio exceeding 10 and equal to or smaller than 30, which is measured on a cross section parallel to the rolling direction, is 50 to 200 number/mm$^2$.

(4) In the steel component according to (3) described above, in a case where tensile fracture of the steel component is performed by tensile stress parallel to the rolling direction to form fracture surfaces, steps, in which a difference in height towards a direction parallel to the tensile stress is equal to or greater than 80 µm and an angle with respect to the direction parallel to the tensile stress is equal to or smaller than 45 degrees, and which are observed on the cross section parallel to the rolling direction, may be formed on the fracture surface at an average number density of equal to or greater than 2.0 pieces per 10 mm, a brittle fracture surface may be 98 area % or more with respect to the fracture surface, an average number density of cracks or recesses, in which an angle with respect to the direction parallel to the tensile stress exceeds 45 degrees, which are formed over a length equal to or longer than 80 µm and observed on the cross section parallel to the rolling direction, and in which a part of the cracks or the recesses are propagated to an inner portion of the steel component, may be smaller than 3 pieces per 10 mm on the fracture surface.

(5) In the steel component according to (3) or (4) described above, the chemical composition may include one or more elements selected from the group consisting of Ti: 0.005 to 0.050 mass %, Nb: 0.005 to 0.030 mass %, Mg: 0.0005 to 0.0050 mass %, and REM: 0.0003 to 0.0010 mass %.

Effects of the Invention

In the hot-rolled steel and the steel component according to the aspect of the invention, the amount of plastic deformation in the vicinity of the fracture surface is small and the amount of chips generated on the fracture surface is decreased, when the fracture and the split are performed. Accordingly, in a case where the fracture surfaces are fit to each other, the fracture surfaces can be fit to each other with excellent accuracy without occurrence of a position displacement, and it is possible to realize improvement of accuracy of the steel component and improvement of yield at the same time. In addition, the hot-rolled steel and the steel component according to the aspect of the invention include very small amount of Bi, and thus, have high cutting machinability. Moreover, when the steel and the steel component according to the aspect of the invention are used, shaking chips off can be omitted, and a manufacturing cost can be reduced. Thus, it is greatly effective in improving economic efficiency in industry. The hot-rolled steel according to one aspect of the invention is suitably used in a steel component obtained by performing forming by hot forging, and specifically, suitably used by fitting fracture surfaces again after performing the fracture and split.

EMBODIMENTS OF THE INVENTION

Hereinafter, a hot-rolled steel and a steel component according to embodiments of the invention will be described.

The inventors found that it is possible to preferably control a size of recesses and protrusions of fracture surfaces obtained by fracture and split in a fracture surface perpendicular direction and to limit the amount of chips, by controlling the shape of Mn sulfide present in a steel.

According to the findings of the inventors, the shapes of recesses and protrusions of the fracture surfaces are affected by the degree of extension and the distribution frequency of Mn sulfide. In a case where the extension of the Mn sulfides is excessively performed (that is, the aspect ratio of the Mn sulfides is great), the sizes of recesses and protrusions in the fracture surface perpendicular direction are significantly increased. Thus, chips or cracks are generated on the fracture surfaces at the time of fracture and split or at the time of fitting the fracture surfaces, and gaps are generated at the time of fitting the fracture surfaces to deteriorate fitting properties. Meanwhile, when the distribution frequency of the extended Mn sulfides is increased, the number of recesses and protrusions of the fracture surfaces is increased to improve fitting properties.

Figure 2:
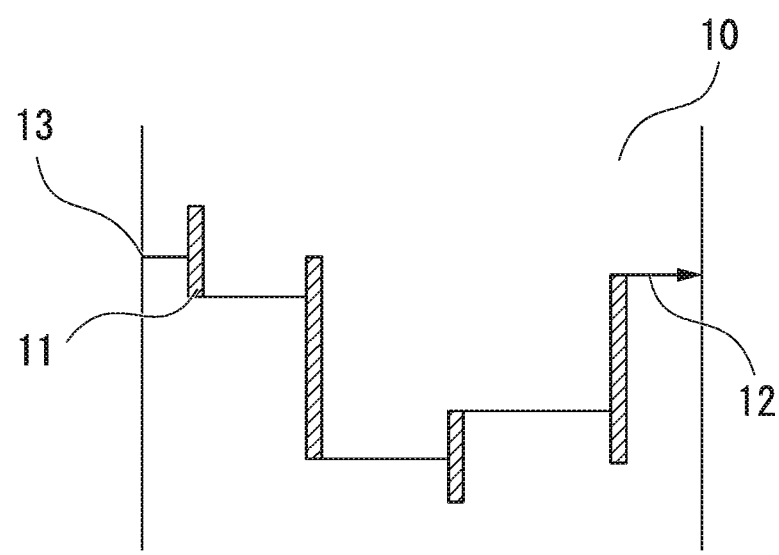
FIG. 2 is a schematic view of crack propagation of a steel component according to the embodiment.

The inventors surmise that the phenomenon described above occurs due to the following configuration. The Mn sulfides of the steel component are extended in a rolling direction during hot rolling of a hot-rolled steel which is a material of the steel component. As shown in FIG. 2, when performing fracture and split of a steel component 10 in a direction substantially perpendicular to the rolling direction, first, a crack 12 is propagated in a direction perpendicular to the rolling direction from a fracture starting point 13. However, it is considered that, if the crack 12 reaches a Mn sulfide 11 extended in the rolling direction, a propagation direction of the crack 12 greatly changes, and the crack 12 is propagated substantially parallel to the rolling direction along an interface between the Mn sulfide and a primary phase of the steel component 10. If the crack 12 reaches an end portion of the Mn sulfide 12, the propagation direction of the crack 12 changes in a stress direction, and the crack 12 is propagated substantially perpendicular to the rolling direction again. It is considered that, when the fracture and split proceed while the crack 12 repeats the propagation perpendicular to the rolling direction and the propagation parallel to the rolling direction, recesses and protrusions are formed on the fracture surfaces. Due to the reason described above, the inventors surmise that, if the number of the Mn sulfides 11 is great, the number of recesses and protrusions is increased, and if an aspect ratio of the Mn sulfides 11 is great, the sizes of recesses and protrusions in the rolling direction are increased.

In addition, the inventors found that adding 0.0001 to 0.0050 mass % of Bi in the steel improves cutting machinability.

Cutting machinability is an index indicating cutting easiness. For example, a steel of which cutting chips formed during cutting is short is determined as a steel having good cutting machinability. If the cutting chips are long, the cutting chips disturb cutting, and thus, the shorter the cutting chips are, the higher the efficiency of the cutting.

In the conventional art, it is known that Bi improves cutting machinability. For example, about 0.1 mass % or more of Bi acts as fracture origin in cutting chips occurring area, so that cutting resistance decreases and cutting chips become shorten. However, it has been considered that, Bi does not sufficiently exerts such mechanism if the amount of Bi is less than about 0.1%, since Bi becomes hard to act as the fracture origin and the number of the fracture origin decreases. On the other hand, Bi is an element deteriorating hot forgeability of the steel, and thus, it is necessary to decrease the amount of Bi as small as possible except on any grounds. Therefore, in view of the common general art, it is considered that the amount of Bi should be decreased as small as possible during manufacturing steel for hot forging in which the cutting machinability thereof is not necessary, and the amount of Bi should be about 0.1% or more if Bi is utilized for enhancing cutting machinability. In addition, it is unprecedented to attempt enhancing both of hot forgeability and cutting machinability with Bi.

However, the inventors found that 0.0001 to 0.0050 mass % of very small amount of Bi enhances cutting machinability of the steel. It is considered that the very small amount of Bi per se does not act as fracture origin in cutting chips occurring area. However, the inventors found that the very small amount of Bi segregates at crystal interface and interface between base phase and inclusion (hereinafter, referred as "interface") in the steel. Segregation of Bi at the interface decreases bonding force between the crystals or bonding force between the base phase and the inclusion. Therefore, when Bi segregates at the interface, the interface acts as fracture origin so that the cutting resistance is decreased and cutting chips are shorten. In accordance with the findings of the inventors regarding the cutting machinability enhancing mechanism based on the very small amount of Bi, the amount of Bi of the hot-rolled steel according to the present embodiment is set as 0.0001 to 0.0050 mass %, which is much less than an amount applied for Bi used as typical cutting machinability imparting element. Accordingly, the cutting machinability of the hot-rolled steel according to the present embodiment is improved without deteriorating hot forgeability.

Chemical compositions, a shape of the Mn sulfide, and a shape of fracture surfaces obtained due to fracture and split of the hot-rolled steel and the steel component according to the embodiment of the invention which are obtained by the above-described findings will be described. The chemical compositions of the hot-rolled steel do not change in accordance with hot working. In addition, since the size of the Mn sulfide is significantly small, compared to a size of distortion applied due to hot working, the shape of the Mn sulfide of the hot-rolled steel substantially do not change in accordance with hot working, either. Therefore, the chemical compositions and the shape of the Mn sulfide of the steel component according to the embodiment which is obtained by performing hot working of the hot-rolled steel according to the embodiment are the same as those of the hot-rolled steel according to the embodiment which will be described later. In addition, since the shape of the fracture surfaces obtained due to fracture and split is determined in accordance with the chemical compositions and the shape of the Mn sulfide, the hot-rolled steel according to the embodiment and the steel component according to the embodiment have the same shape of fracture surfaces obtained due to fracture and split.

The hot-rolled steel of the embodiment is a steel including C, Si, Mn, P, S, Cr, V, Zr, N, and Bi as chemical compositions, with predetermined percentages. When the hot-rolled steel of the embodiment includes the chemical compositions which will be described later, ductility is preferably controlled, it is possible to improve a percentage of a brittle fracture surface of a fracture surface (tensile fracture surface) obtained due to tensile stress, and it is possible to increase the size of recesses and the protrusions of fracture surfaces in the fracture surface perpendicular direction by precipitating the Mn sulfides. Accordingly, in the hot-rolled steel of the embodiment, the fracture surfaces obtained at the time of the fracture and split have high fitting properties. In addition, the hot-rolled steel of the embodiment may arbitrarily include one or more elements of Ti, Nb, Mg, and REM, as chemical compositions.

Hereinafter, a reason for limiting the chemical compositions of the hot-rolled steel and the steel component of the embodiment will be described. Hereinafter, the reason for limiting the chemical compositions of the hot-rolled steel is equivalent to the reason for limiting the chemical compositions of the steel component, unless otherwise noted.

C: 0.35 to 0.45 Mass %

C has an effect of ensuring a tensile strength of the hot-rolled steel and the steel component of the embodiment and an effect of realizing excellent fracture-split properties by decreasing the amount of plastic deformation in the vicinity of a fracture surface at the time of the fracture. Since the volume fraction of a pearlite structure increases due to an increase of the C content, the tensile strength increases, and the ductility and toughness decrease. In order to exhibit these effects to the maximum, the C content in the steel was set to 0.35 to 0.45 mass %. If the C content exceeds the upper limit value, a pearlite fraction of the hot-rolled steel becomes excessive and a frequency of generation of chips at the time of the fracture increases. In addition, in a case where the C content is less than the lower limit value, the amount of plastic deformation in the vicinity of a fracture surface of the hot-rolled steel increases, and fitting properties of the fracture surfaces decrease. The preferable lower limit value of the C content is 0.36 mass % or 0.37 mass %. The preferable upper limit value of the C content is 0.44 mass %, 0.42 mass %, or 0.40 mass %.

Si: 0.6 to 1.0 Mass %

Si strengthens a ferrite by solute strengthening to decrease ductility and toughness of the hot-rolled steel and the steel component. Due to the decrease of ductility and toughness, the amount of plastic deformation in the vicinity of a fracture surface at the time of the fracture decreases, and the fracture-split properties of the hot-rolled steel and the steel component are improved. In order to obtain this effect, it is necessary that a lower limit of a Si content is set to 0.6 mass %. Meanwhile, if the Si is excessively included, the frequency of generation of chips of the fracture surfaces increases. Accordingly, the upper limit of the Si content is set to 1.0 mass %. The preferable lower limit value of the Si content is 0.7 mass %. The preferable upper limit value of the Si content is 0.9 mass %.

Mn: 0.60 to 0.90 Mass %

Mn strengthens a ferrite by solute strengthening to decrease ductility and toughness of the hot-rolled steel and the steel component. Due to the decrease of ductility and toughness, the amount of plastic deformation in the vicinity of a fracture surface at the time of the fracture decreases, and the fracture-split properties of the hot-rolled steel and the steel component are improved. In addition, Mn is combined with S to form a Mn sulfide. When performing the fracture and split of the steel component obtained from the hot-rolled steel of the embodiment, cracks are propagated along the Mn sulfides extending in the rolling direction. Accordingly, Mn has an effect of increasing the size of the recesses and the protrusions of the fracture surfaces and preventing position displacement when fitting the fracture surfaces to each other. However, if the amount of Mn is insufficient, precipitation temperature of the Mn sulfides falls below a proper range, i.e. crystallizing temperature range and falls within a precipitating temperature range. Crystallization is separation and formation of a matter from liquid phase, and precipitation is separation and formation of a matter from solid phase. Mn sulfides occurred via crystallization tend to be coarser than Mn sulfides occurred via precipitation. If the precipitation temperature of the Mn sulfides falls within the precipitation temperature range, density of the Mn sulfides which propagates crack may become excess, cracks along with tensile direction may be separated, and the steps along with the tensile strength may be prevented from growth. Meanwhile, in a case where Mn is excessively included, the ferrite is excessively hardened, and the frequency of generation of chips at the time of the fracture increases. In consideration of these effects, a Mn content is set to 0.60 to 0.90 mass %. In addition, the preferable lower limit value of the Mn content is 0.65 mass %, 0.70 mass %, or 0.75 mass %. The preferable upper limit value of the Mn content is 0.85 mass %, 0.83 mass %, or 0.80 mass %.

P: 0.010 to 0.035 Mass %

P decreases ductility and toughness of a ferrite and a pearlite to decrease ductility and toughness of the hot-rolled steel and the steel component. Due to the decrease of ductility and toughness, the amount of plastic deformation in the vicinity of a fracture surface at the time of the fracture decreases, and the fracture-split properties of the hot-rolled steel and the steel component are improved. However, P causes excessive embrittlement of a grain boundary and causes chips of the fracture surfaces to be easily generated. Therefore, a method for decreasing the ductility and the toughness by adding P should not aggressively utilized from viewpoints of prevention of chips. In consideration of the above-mentioned description, a range of a P content is set to 0.010 to 0.035 mass %. The preferable lower limit value of the P content is 0.012 mass %, 0.013 mass %, or 0.015 mass %. The preferable upper limit value of the P content is 0.030 mass %, 0.028 mass %, or 0.025 mass %.

S: 0.06 to 0.10 Mass %

S is combined with Mn to form a Mn sulfide. When performing the fracture and split of the steel component obtained from the hot-rolled steel of the embodiment, cracks are propagated along the Mn sulfides extending in the rolling direction. Accordingly, the Mn sulfide has an effect of increasing the size of the recesses and the protrusions of the fracture surfaces in the fracture surface perpendicular direction and preventing position displacement when fitting the fracture surfaces to each other. In order to obtain this effect, it is necessary that a lower limit of an S content is set to 0.06 mass %. Meanwhile, if the S is excessively included, the amount of plastic deformation in the vicinity of a fracture surface at the time of the fracture and split increases, and the fracture-split properties may be decreased. In addition, the excessive amount of S may promote the generation of chips of the fracture surfaces. Due to the reasons described above, a suitable range of the S content is set to 0.06 to 0.10 mass %. The preferable lower limit value of the S content is 0.07 mass %. The preferable upper limit value of the S content is 0.09 mass %.

Cr: 0.25 Mass % or Less

Cr strengthens a ferrite by solute strengthening to decrease ductility and toughness of the hot-rolled steel and the steel component, in the same manner as Mn. The decreasing of the ductility and the toughness allows a decrease in the amount of plastic deformation in the vicinity of a fracture surface at the time of the fracture and improvement of fracture-split properties of the hot-rolled steel and the steel component. In order to obtain the effect, it is preferable that the lower limit of a Cr content is set to 0.02 mass %. However, if Cr is excessively included, a lamellar spacing of the pearlite is decreased, and the ductility and the toughness of the pearlite increase. Accordingly, the amount of plastic deformation in the vicinity of a fracture surface at the time of the fracture is increased and the fracture-split properties are decreased. In addition, if Cr is excessively included, a bainite structure is easily generated, and the fracture-split properties may be significantly decreased. Therefore, in a case of including Cr, the amount thereof is set to be equal to or less than 0.25 mass %. The preferable lower limit value of the Cr content is 0.05 mass %, 0.06 mass %, 0.08 mass %, or 0.10 mass %. The preferable upper limit value of the Cr content is 0.23 mass %, 0.20 mass %, or 0.18 mass %.

V: 0.20 to 0.40 Mass %

V strengthens a ferrite and decreases the ductility and toughness of the hot-rolled steel and the steel component, by mainly forming carbide or a carbonitride during cooling after hot forging. The decreasing of the ductility and the toughness allows a decrease in the amount of plastic deformation in the vicinity of a fracture surface of the hot-rolled steel and the steel component at the time of the fracture and improvement of fracture-split properties of the hot-rolled steel manufactured from the steel component. In addition, V has an effect of increasing a yield ratio of the hot-rolled steel by precipitation strengthening of a carbide or a carbonitride. In order to obtain these effects, it is necessary that the lower limit of the V content is set to 0.20 mass %. The preferable lower limit value of the V content is 0.23 mass % or 0.25 mass %. Meanwhile, if V is excessively included, the effect becomes saturated. Therefore, the upper limit of the V content is 0.40 mass %. The preferable upper limit value of the V content is 0.38 mass % or 0.35 mass %.

Zr: 0.0002 to 0.0050 Mass %

Zr forms an oxide, this Zr oxide becomes a crystallization nucleus or a precipitation nucleus of the Mn sulfides, and the Mn sulfides are evenly and finely dispersed. The Mn sulfides which are evenly and finely dispersed become propagation paths of the cracks at the time of the fracture and split, and have an effect of decreasing the amount of plastic deformation in the vicinity of a fracture surface and increasing the fracture-split properties of the hot-rolled steel and the steel component. In order to obtain the effects, it is necessary that the lower limit of the Zr content is set to 0.0002 mass %. However, if Zr is excessively included, the effect becomes saturated. Therefore, an upper limit of a Zr content is set to 0.0050 mass %. The preferable lower limit value of the Zr content is 0.0005 mass % or 0.0010 mass %. The preferable upper limit value of the Zr content is 0.0045 mass %, 0.0040 mass %, 0.0030 mass %, or 0.0029 mass %.

N: 0.0060 to 0.0150 Mass %

N mainly forms a V nitride or a V carbonitride at the time of cooling after hot forging and functions as a transformation nucleus of a ferrite, to promote ferritic transformation. Accordingly, N has an effect of preventing generation of a bainite structure which significantly impairs the fracture-split properties of the steel component obtained from the hot-rolled steel. In order to obtain this effect, a lower limit of an N content is set to 0.0060 mass %. If N is excessively included, hot ductility of the hot-rolled steel and the steel component decreases, and cracks or defects may be easily generated at the time of hot working. Therefore, the lower limit of the N content is set to 0.0150 mass %. In addition, the preferable lower limit value of the N content is 0.0065 mass %, 0.0070 mass %, 0.0080 mass %, or 0.0085 mass %. The preferable upper limit value of the N content is 0.0140 mass %, 0.0130 mass %, or 0.0120 mass %.

Bi: 0.0001 to 0.0050 Mass %

Bi has an effect of decreasing deformation resistance during cutting by segregating at crystal boundary and boundary between base phase and inclusions and decreasing bonding force of the boundary. In view of the conventional art, it is considered that it is necessary for improving cutting machinability by Bi per se, which acts as fracture origin during cutting deformation, to set the Bi contents to about 0.1 mass % or more. However, the inventors did not use Bi as the fracture origin during the cutting deformation but used Bi as an element which embrittles the boundary, and found that Bi can improve cutting machinability even if the content is 0.0050 mass % or less.

In order to exhibit the above-described effect, the lower limit of the Bi content is set to 0.0001%. However, as a preferable range in order to sufficiently exhibit the effect, the Bi content may be set to be 0.0015 mass % or more. On the other hand, if the Bi content excesses 0.0050 mass %, hot forgeability of the hot-rolled steel and the steel component may be deteriorated. In addition, if the Bi content excesses 0.0050 mass %, the boundary may be excessively embrittled and chips may easily occur at fracture surface. Therefore, the upper limit of the Bi content is set to 0.0050 mass %. It is preferable that the Bi content is 0.0045% or less, 0.0040% or less, 0.0035% or less, or 0.0030% or less.

In order to more significantly realize the effects of the invention, the hot-rolled steel according to the embodiment can further include by selecting one or more elements selected from the group consisting of Ti: 0.050 mass % or less, Nb: 0.030 mass % or less, Mg: 0.0050 mass % or less, and REM: 0.0010 mass % or less. However, the hot-rolled steel and the steel component according to the embodiment can solve the problems, even in a case where Ti, Nb, Mg, and/or REM are not included. Accordingly, the lower limit value of Ti, Nb, Mg, and REM is 0 mass %.

Ti: 0 to 0.050 Mass %

Ti strengthens a ferrite by precipitation strengthening to decrease ductility and toughness of the hot-rolled steel and the steel component, by mainly forming a carbide or a carbonitride during cooling after hot forging. The decreasing of the ductility and the toughness allows a decrease in the amount of plastic deformation in the vicinity of a fracture surface at the time of the fracture and improvement of fracture-split properties. However, if Ti is excessively included, the effect becomes saturated. In a case of including Ti in order to obtain the effect described above, it is preferable that the upper limit of a Ti content is set to 0.050 mass %. In order to sufficiently exhibit the effect of Ti, the lower limit of the Ti content is preferably set to 0.005 mass %. A more suitable lower limit value of the Ti content is 0.015 mass %, 0.018 mass %, or 0.020 mass %. A more suitable upper limit value of the Ti content is 0.040 mass %, 0.035 mass %, or 0.030 mass %.

Nb: 0 to 0.030 Mass %

Nb strengthens a ferrite by precipitation strengthening to decrease ductility and toughness of the hot-rolled steel and the steel component, by mainly forming a carbide or a carbonitride during cooling after hot forging. The decreasing of the ductility and the toughness allows a decrease in the amount of plastic deformation in the vicinity of a fracture surface at the time of the fracture and improvement of fracture-split properties of the hot-rolled steel and the steel component. However, if Nb is excessively included, the effect becomes saturated. In a case of including Nb in order to obtain the effect described above, it is preferable that the upper limit of a Nb content is set to 0.030 mass %. In order to sufficiently exhibit the effect of Nb, the lower limit of the Nb content is preferably set to 0.005 mass %. A more suitable lower limit value of the Nb content is 0.010 mass %. A more suitable upper limit value of the Nb content is 0.0030 mass %, 0.028 mass %, or 0.025 mass %.

Mg: 0 to 0.0050 Mass %

Mg forms an oxide and becomes a crystal precipitation nucleus or a precipitation nucleus of the Mn sulfides, which evenly and finely disperses the Mn sulfides. The Mn sulfides become propagation paths of the cracks at the time of the fracture and split, decrease the amount of plastic deformation in the vicinity of a fracture surface, and increase the fracture-split properties of the hot-rolled steel and the steel component. However, if Mg is excessively included, the effect becomes saturated. Therefore, it is preferable that the upper limit of the Mg content is set to 0.0050 mass %. In order to sufficiently exhibit the effect, the lower limit of the Mg content is preferably set to 0.0005 mass %. A more suitable lower limit value of the Mg content is 0.0006 mass %. A more suitable upper limit value of the Mg content is 0.0045 mass %, 0.0040 mass %, 0.0035 mass %, 0.0030 mass %, 0.0025 mass %, or 0.0015 mass %.

REM: 0 to 0.0010 Mass %

REM forms an oxysulphide and becomes a crystal precipitation nucleus or a precipitation nucleus of the Mn sulfides, which evenly and finely disperses the Mn sulfides. The Mn sulfides become propagation paths of the cracks at the time of the fracture and split, decrease the amount of plastic deformation in the vicinity of a fracture surface, and increase the fracture-split properties of the hot-rolled steel and the steel component. However, if REM is excessively included, problems such as nozzle clogging during casting occur in a stage for manufacturing a steel. Therefore, the upper limit of a REM content is set to 0.0010 mass %. In order to sufficiently exhibit the effect, the lower limit of the REM content is preferably set to 0.0003 mass %. A more suitable lower limit value of the REM content is 0.0004 mass % or 0.0005 mass %. A more suitable upper limit value of the REM content is 0.0009 mass %, or 0.0008 mass %. The term "REM" indicates the total 17 elements consisting of Sc, Y, and lanthanoid, and the "REM content" means the total amount of these 17 elements. In a case of using lanthanoid as REM, REM is added in the form of misch metal, industrially.

The remainder of the chemical compositions of the hot-rolled steel and the steel component according to the embodiment are iron and impurities. The impurities are components which are mixed therein from a raw material such as an ore or a scrap and/or a manufacturing environment and which do not affect the characteristics of the hot-rolled steel and the steel component according to the embodiment. In addition to the components described above, the hot-rolled steel and the steel component according to the embodiment can include elements other than above-described composition. For example, 0 to 0.01 mass % of Te, 0 to 0.01 mass % of Zn, 0 to 0.01 mass % of Sn, and the like can be included, since they do not impair the effects of the hot-rolled steel and the steel component according to the embodiment.

Metallographic Structure: 90 Area % or More is Configured with Ferrite and Pearlite The metallographic structure of the hot-rolled steel and the steel component of the embodiment is a so-called a ferrite-pearlite structure. Bainite and the like may be included in the metallographic structure, but it is not preferable because bainite impairs the fracture-split properties. Therefore, the inventors determined that the metallographic structure of the hot-rolled steel and the steel component of the embodiment includes 90 area % or more of ferrite and pearlite in total. With this determination, the amount of bainite is limited to be 10 area % or less and the fracture-split properties of the hot-rolled steel and the steel component are excellently maintained. The metallographic structure of the hot-rolled steel and the steel component of the embodiment may include 92 area % or more, 95 area % or more, or 98 area % or more of ferrite and pearlite in total.

The ratio of the amounts of the ferrite and the pearlite is not particularly limited, as long as the total amount of the ferrite and the pearlite is in the range described above. For example, even if the amount of ferrite or pearlite is 0 area %, excellent fracture-split properties are maintained as long as 90 area % or more of the metallographic structure is configured with the ferrite and the pearlite. In addition, the configuration of the remainder of the metallographic structure is not particularly limited, as long as the total amount of ferrite and the pearlite is in the range described above. The amounts of ferrite and pearlite included in the metallographic structure are acquired by capturing a photomicrograph of a polished and etched cross section and performing image analysis of this photomicrograph.

(Average Number Density of Mn Sulfides, Having Equivalent Circle Diameter of 1 to 5 μm, Extending Along Rolling Direction and Having Aspect Ratio Exceeding 10 and Equal to or Smaller than 30, Measured on Cross Section Parallel to Rolling Direction: 50 to 200 Number/mm$^2$)

The Mn sulfides are formed in the hot-rolled steel and the steel component of the embodiment. The Mn sulfides are extended along the rolling direction of the hot-rolled steel. The extended Mn sulfides are essential inclusion for forming appropriate shapes of recesses and protrusions on fracture surfaces obtained by performing tensile fracture with respect to the hot-rolled steel and the steel component.

In the hot-rolled steel and the steel component according to the embodiment, 50 or more and 200 or less of the extended Mn sulfides having an equivalent circle diameter of 1 to 5 μm and having an aspect ratio in which the rolling direction is a long axis side exceeding 10 and equal to or smaller than 30 are dispersed per 1 mm$^2$. The extended Mn sulfides form recesses and protrusions in a tensile direction on the fracture surfaces formed by performing the tensile fracture in the rolling direction and increase the fitting properties between the fracture surfaces. The Mn sulfides satisfying the above-described definitions regarding equivalent circle diameter and aspect ratio can optimize the sizes of the recesses and the protrusions in the tensile direction. In addition, in a case where the number of Mn sulfides satisfying the above-described definitions regarding equivalent circle diameter and aspect ratio is 50 to 200 number/mm$^2$, the number of the recesses and the protrusions can be optimized.

The Mn sulfides having an aspect ratio equal to or smaller than 10 and the Mn sulfides having an equivalent circle diameter of less than 1 μm cannot sufficiently increase the sizes of the recesses and the protrusions of the fracture surfaces in the tensile direction and do not contribute to the improvement of the fitting properties between the fracture surfaces. The Mn sulfides having an aspect ratio exceeding 30 and the Mn sulfides having an equivalent circle diameter of more than 5 μm form significant recesses and protrusions of the fracture surfaces, but increase the frequency of generation of cracks or chips, and impair the fitting properties between the fracture surfaces. Therefore, it is preferable that the number density of the Mn sulfides which do not satisfy the above-described definitions regarding equivalent circle diameter and aspect ratio is small. However, in a case where the number density of the Mn sulfides satisfying the above-described definitions regarding equivalent circle diameter and aspect ratio is in the range described above and the amounts of Mn and S which are generating sources of the Mn sulfides are in the ranges described above, Mn and S in the chemical compositions are consumed for the Mn sulfides satisfying the above-described definitions regarding equivalent circle diameter and aspect ratio and the generation of the Mn sulfides which do not satisfy the above-described definitions regarding equivalent circle diameter and aspect ratio is sufficiently prevented. Accordingly, the number density of the Mn sulfides which do not satisfy the above-described definitions regarding equivalent circle diameter and aspect ratio is not particularly limited.

In a case where the average number density of the Mn sulfides satisfying the above-described definitions regarding equivalent circle diameter and aspect ratio is smaller than the lower limit value, the number of the recesses and the protrusions of fracture surfaces is decreased and the fitting properties of the fracture surfaces after the fracture and split are insufficient. In addition, in a case where the average number density of the Mn sulfides satisfying the above-described definitions regarding equivalent circle diameter and aspect ratio is smaller than the lower limit value, the number density of the Mn sulfides which do not satisfy the above-described definitions regarding equivalent circle diameter and aspect ratio may be increased to impair the fracture-split properties. On the other hand, the lower limit of the average number density of the Mn sulfides satisfying the above-described definitions regarding equivalent circle diameter and aspect ratio may be 80 number/mm$^2$, 95 number/mm$^2$, or 110 number/mm$^2$.

In a case where the average number density of the Mn sulfides satisfying the above-described definitions regarding equivalent circle diameter and aspect ratio is greater than the upper limit value, cracks or chips are generated on the fracture surfaces, and in this case, the fitting properties of the fracture surfaces are also impaired. In addition, in a case where the average number density of the Mn sulfides satisfying the above-described definitions regarding equivalent circle diameter and aspect ratio is greater than the upper limit value, cracks along with tensile direction may be separated, and the steps along with the tensile strength may be prevented from growth. On the other hand, the upper limit of the average number density of the Mn sulfides satisfying the above-described definitions regarding equivalent circle diameter and aspect ratio may be 195 number/mm$^2$, 180 number/mm$^2$, or 160 number/mm$^2$.

A measurement method of the average number density of the Mn sulfides satisfying the above-described definitions regarding equivalent circle diameter and aspect ratio in the hot-rolled steel and the steel component is as follows.

First, the hot-rolled steel and the steel component are cut in parallel to the rolling direction and cut sections are polished. Since the Mn sulfides are extended along the rolling direction, an extension direction of the Mn sulfides can be considered as the rolling direction of the hot-rolled steel and the steel component, when cutting the hot-rolled steel and the steel component.

Then, enlarged images of the cut sections are captured with an optical microscope or an electron microscope. A magnification at this time is not particularly limited and is preferably approximately 100 times. Since the Mn sulfides are substantially evenly distributed, the area for capturing an image is not particularly limited.

By performing image analysis of the images, it is possible to obtain the number density of the Mn sulfides satisfying the above-described definitions regarding equivalent circle diameter and aspect ratio in the area where the images are captured. Some extended Mn sulfides may be divided and distributed to be aggregated in a row shape in the rolling direction. However, two Mn sulfides which are arranged in the extension direction and between which a gap of the ends thereof is equal to or smaller than 10 μm are considered as one extended Mn sulfide. This is because it is thought that such two Mn sulfides exhibit the same behavior as that of one Mn sulfide, in a point of propagating cracks generated at the time of the tensile fracture of the hot-rolled steel or the steel component in the tensile direction.

Further, the capturing images and the analysis are repeated at least 10 times and the number density obtained by these operation is averaged. Accordingly, the average number density of the Mn sulfides satisfying the above-described definitions regarding equivalent circle diameter and aspect ratio is acquired.

Next, a manufacturing method for the hot-rolled steel according to the embodiment will be described.

A manufacturing method for the hot-rolled steel according to the embodiment includes:

melting and continuous casting a steel having the same chemical compositions as those of the hot-rolled steel according to the embodiment to obtain a bloom;

hot working such as blooming the bloom to obtain a billet; and hot rolling the billet to obtain a round bar, in which Zr is added in an initial stage of secondary refining in the melting, in which a total reduction of area in the hot rolling is equal to or greater than 80%, and in which a reduction of area within a temperature equal to or lower than 1,000° C. in the hot rolling is equal to or greater than 50%.

A manufacturing method for the steel component according to the embodiment includes:

heating the hot-rolled steel according to the embodiment to 1,150° C. to 1,280° C., hot forging, and air cooling or blast cooling the hot-rolled steel subjected to the hot forging to room temperature, or cold forging the hot-rolled steel according to the embodiment; and cutting the cooled hot-rolled steel to obtain a steel component having a predetermined shape.

The specific manufacturing method of the hot-rolled steel according to the embodiment is as follows. First, a steel having the same chemical compositions as those of the hot-rolled steel according to the embodiment is melted in a converter furnace and subjected to continuous casting to manufacture a bloom. At the time of the melting in a converter furnace, Zr is added into a molten steel before the secondary refining or during the secondary refining. In order to allow coarse Zr oxides to be sufficiently floated and separated from the molten steel and finely disperse Mn sulfides generated using the Zr oxides as nuclei in the molten steel, it is necessary to add Zr in an initial stage of the secondary refining (for example, before performing degassing treatment with respect to the molten steel by using Ruhrstahl-Heraeus (RH) or within 15 minutes after starting the treatment which is during the degassing treatment by RH). In a case where Zr is added after 15 minutes after starting the degassing treatment by using RH or the like, the time for refining the Mn sulfides using the Zr oxides is insufficient. Thus, the Mn sulfides in the bloom become coarse. In a case where the Mn sulfides in the bloom become coarse, an equivalent circle diameter of the Mn sulfide becomes out of the predetermined range, and the Mn sulfides are excessively extended during blooming which will be performed later, so that the number of Mn sulfides which do not satisfy the above-described definitions regarding equivalent circle diameter and aspect ratio is increased.

The obtained bloom is set to a billet through further the blooming and the like. The obtained billet is set to a round bar by further performing hot rolling. By doing so, the hot-rolled steel of the embodiment is manufactured. A rolling reduction of area when setting the billet as a round bar shape is preferably equal to or greater than 80%. Thereby, the Mn sulfides in the steel can be extended. In addition, in order to significantly realize the extension of the Mn sulfides, it is necessary to perform hot rolling in a temperature range in which the hot hardness of the Mn sulfides is relatively low with respect to that of the steel, that is, a temperature range in which the extension of the Mn sulfides is easily performed. Specifically, it is necessary that the rolling reduction of area within a temperature equal to or lower than 1,000° C. is set to be equal to or greater than 50%. Accordingly, it is possible to extend the Mn sulfides in the steel. In a case where these rolling conditions are not satisfied, the Mn sulfides are not sufficiently extended. The hot-rolled steel after performing the hot rolling may be cooled to room temperature or may be supplied to be further subjected to hot forging before the cooling.

The specific manufacturing method of the steel member according to the embodiment is as follows. The hot-rolled steel obtained by the method described above is, for example, heated to 1,150° C. to 1,280° C. to perform the hot forging, and cooled to room temperature by air cooling (cooling by leaving the steel in the atmosphere) or blast cooling (cooling by sending wind to a steel). By cutting the forged steel after the cooling, a steel component having a predetermined shape is obtained. When performing the forging of the hot-rolled steel, the forging is not limited to hot forging and cold forging may be performed.

In the hot-rolled steel and the steel component of the embodiment, in a case where tensile fracture is performed by tensile stress parallel to the rolling direction to form fracture surfaces, steps, in which a difference in height towards a direction parallel to the tensile stress is equal to or greater than 80 μm and an angle with respect to the direction parallel to the tensile stress is equal to or smaller than 45 degrees, and which are observed on the cross section parallel to the rolling direction, are formed on the fracture surface at an average number density of equal to or greater than 2.0 pieces per 10 mm. That is, the average number of the above-described steps in a line, which is an arbitrary line (for example, a line passing a center of the fracture surface) drawn in the fracture surface formed by the tensile fracture of the hot-rolled steel and the steel component of the embodiment caused by the tensile stress parallel to the rolling direction, is 2.0 pieces per 10 mm or more. In addition, in the hot-rolled steel and the steel component of the embodiment, in a case where tensile fracture is performed by tensile stress parallel to the rolling direction to form fracture surfaces, the average number density of cracks or recesses, in which an angle with respect to the direction parallel to the tensile stress exceeds 45 degrees, which are formed over a length equal to or longer than 80 μm and observed on the cross section parallel to the rolling direction, and in which a part of the cracks or the recesses are propagated to an inner portion of the steel component, is limited to be smaller than 3.0 pieces per 10 mm on the fracture surface. Moreover, in the hot-rolled steel and the steel component of the embodiment, in a case where tensile fracture is performed by tensile stress parallel to the rolling direction to form fracture surfaces, a brittle fracture surface is 98 area % or more with respect to the fracture surface.

A reason of determining the properties of the fracture surface is as follows. When the fracture surfaces formed by the tensile fracture are fit to each other and stress is applied to the fracture surfaces in a horizontal direction, the stress is three-dimensionally dispersed in the horizontal direction and two normal directions (tilt direction of 90 degrees in the plane and a direction perpendicular to the fracture surfaces) due to the recesses and the protrusions of the fracture surfaces. In this case, as the sizes of the recesses and the protrusions of the fracture surfaces in the tensile direction are great, the applied stress is more dispersed. The inventors determined that, in a case where the steps formed by the recesses and the protrusions have an angle with respect to the direction parallel to the tensile stress equal to or smaller than 45 degrees and have a difference in height towards the direction parallel to the tensile stress equal to or greater than 80 μm, the recesses and the protrusions contribute to the fitting properties. In addition, as long as the chips of the fracture surfaces are not generated, when the sizes of the steps of the fracture surfaces in the tensile direction are great, it is possible to more reliably prevent the position displacement at the time of applying stress.

The amount of generated chips correlates with the presence of the cracks or the recesses in the fracture surfaces, which extend along with a direction perpendicular to the tensile direction (extend along with the fracture surface direction). That is, as the number of cracks in the fracture surface direction or the recesses in the fracture surface direction having a size equal to or greater than a certain size is great, the amount of generated chips is increased. It is considered that, when fitting the fracture surfaces to each other, the cracks or the recesses in the fracture surface direction function as a stress concentration part and are finely fractured. Accordingly, chips are generated. The inventors found that it is necessary that the number of cracks or recesses in the fracture surface direction is suppressed to the minimum, in order to limit the amount of chips generated in the fracture surfaces. Specifically, the inventors found that, in order to sufficiently suppress the amount of generated chips, it is necessary that the average number density of cracks or recesses, in which an angle with respect to the direction parallel to the tensile stress exceeds 45 degrees, which are formed over a length equal to or longer than 80 μm and observed on the cross section parallel to the rolling direction, and in which a part of the cracks or the recesses are propagated to an inner portion of the steel component, is limited to be smaller than 3.0 pieces per 10 mm.

Since the shape and the dispersed state of the Mn sulfides particularly greatly affect the shape of the fracture surfaces, it is important to control the shape and the dispersed state of the Mn sulfides, in order to maximize the recesses and the protrusions of the fracture surfaces within a range not generating the chips. More specifically, extending the Mn sulfides which become propagation paths of the cracks in a proper range and dispersing a large amount of the Mn sulfides contribute to the increasing the sizes of the recesses and of protrusions of the fracture surfaces in the tensile direction. Therefore, in the hot-rolled steel and the steel component according to the present embodiment, the significant shapes of the recesses and the protrusions of the fracture surfaces, which can be experimentally realized within a range not generating the chips of the fracture surface at the time of the fracture, were determined as described above.

In addition, in the hot-rolled steel and the steel component according to the embodiment, the chemical composition is preferably controlled, 90 area % or more of the metallographic structure is configured with a ferrite and a pearlite, and the Mn sulfides having a predetermined shape are dispersed in the inner part thereof. Accordingly, 98 area % or more of the fracture surfaces obtained by splitting the hot-rolled steel and the steel component according to the embodiment by the tensile stress parallel to the rolling direction becomes a brittle fracture surface. Since the distortion occurs in a ductile fracture surface, the ductile fracture surface impairs the fitting properties of the fracture surfaces. In a case where 98 area % or more of the fracture surfaces is the brittle fracture surface, the fitting properties of the fracture surfaces are preferably maintained.

An evaluation method of the shape of the fracture surfaces is as follows.

The area ratio of the brittle fracture surface with respect to the fracture surface is acquired by analyzing an image according to a method of a typical fracture surface analysis, demarcating a region where a brittle fracture surface configured with a cleavage crack, a pseudo cleavage crack, or an intergranular crack is generated, and calculating a percentage of the area of the region of the brittle fracture surface with respect to the area of the entire fracture surface.

The distortion amount generated due to the fracture and split is acquired by facing and bolting the hot-rolled steel or the steel component after the fracture, measuring a difference between an inner diameter in the fracture direction and an inner diameter in a direction perpendicular to the fracture direction, and considering this difference as the distortion amount generated due to the fracture and split.

The amount of chips generated in the fracture surfaces is acquired by repeating an operation of facing and bolting the fracture surfaces at a torque of 20 N·m to assemble the fracture surfaces and then, loosening the bolt to release the fracture surfaces, 10 times, measuring the total weight of fragments dropped due to the operations, and considering the total weight as the amount of chips generated on the fracture surfaces.

The number density of steps (steps in the tensile direction), in which a difference in height towards a direction parallel to the tensile stress is equal to or greater than 80 μm and an angle with respect to the direction parallel to the tensile stress is equal to or smaller than 45 degrees, and which are observed on the cross section parallel to the rolling direction, and the number density of cracks or recesses (cracks in the fracture surface direction), in which an angle with respect to the direction parallel to the tensile stress exceeds 45 degrees, which are formed over a length equal to or longer than 80 μm and observed on the cross section parallel to the rolling direction, and in which a part of the cracks or the recesses are propagated to an inner portion of the steel component, are evaluated by the following method. First, the hot-rolled steel or the steel component, in which the fracture surfaces are formed, is cut in a direction parallel to a tensile direction to allow the observation of the shapes of the fracture surfaces in a direction perpendicular to the tensile direction. By performing resin embedding with respect to the fracture surfaces before the cutting, the shapes of the fracture surfaces may be maintained at the time of cutting. By observing the shapes of the fracture surfaces on the cut sections described above, recesses and protrusions in the tensile direction and recesses and protrusions in the fracture surface direction can be observed.

The cut sections used for measuring the number density of the steps in the tensile direction and the number density of the cracks in the fracture surface direction can be formed at an arbitrary position of a test piece, as long as it is parallel to the tensile direction, and it is preferable that the cut sections are formed so that the fracture surfaces of the cut sections are large as possible, for convenience. The observation is performed with arbitrary 5 or more fields of view of the cut sections. The number density of steps in the tensile direction and cracks in the fracture direction per 10 mm, at each field of view, is respectively measured and average values thereof are acquired at the time of observation. Accordingly, the number density of each step in the fracture direction and cracks in the tensile direction is acquired.

The method of the fracture of the hot-rolled steel and the steel component according to the embodiment is not particularly limited, and the fracture is preferably performed by using tensile stress parallel to the rolling direction. Since the Mn sulfides of the hot-rolled steel and the steel component according to the embodiment are extended in a direction parallel to the rolling direction, an effect of formation of recesses and protrusions due to the Mn sulfides is maximized by applying the tensile stress parallel to the rolling direction to form fracture surfaces substantially perpendicular to the rolling direction. Accordingly, an effect of formation of recesses and protrusions due to the Mn sulfides is maximized. In addition, in order to improve the fracture-split properties, it is preferable that notch machining is performed with respect to a portion where the fracture surface is to be formed, before applying tensile stress. A method of the notch machining is not particularly limited, and the notching machining may be performed by, for example, broaching or laser machining.

In the hot-rolled steel and the steel component of the embodiment, the amount of plastic deformation in the vicinity of a fracture surface is small and the amount of chips generated on the fracture surfaces is decreased, at the time of the fracture and split. Accordingly, in a case where the fracture surfaces are fit to each other, the fracture surfaces can be fit at excellent accuracy without position displacement, and it is possible to realize the improvement of accuracy of the steel component and improvement of yield. In addition, a very small amount of Bi included in the steel can improve cutting machinability. Moreover, when the hot-rolled steel and the steel component of the embodiment are used, shaking chips off can be omitted, and a manufacturing cost can be reduced. Thus, it is greatly effective in improving economic efficiency in industry.

EXAMPLES

The invention will be described in detail with reference to Examples. Examples are for describing technical significance and effects of the invention, and the scope of the invention is not limited.

Example 1

A bloom was manufactured by performing continuous casting of each of steels having compositions shown in Table 1 and Table 2 and melted in a converter furnace, this bloom was set to a billet having a size of 162 mm×162 mm through the blooming, and a round bar having a diameter of 56 mm was obtained by the hot rolling. When melting the steels other than the steel O1, Zr was added into the molten steel before performing the degassing treatment with respect to the molten steel by using RH or within 15 minutes after starting the degassing treatment. Zr was not added during melting the steel O1. When obtaining the round bar by performing the hot rolling with respect to the billet, the total reduction of area was set to 90% and the reduction of area in a temperature range equal to or lower than 1,000° C. was set to 80%. A symbol "-" shown in the tables indicates that a content of an element relating to a part where the symbol is shown, is lower than measurable limits (i.e. the content is on the same level as a content of impurities). The heating temperature and a heating time of the bloom before the blooming rolling were respectively 1,270° C. and 140 min, and a heating temperature and a heating time of the billet before the hot rolling were respectively 1,240° C. and 90 min. Values shown with underlines in Table 2 are numerical values out of the ranges of the invention.

The average number density (Mn sulfide number density) of the Mn sulfides having an equivalent circle diameter of 1 to 5 μm, extending along a rolling direction, extending along the rolling direction, and having an aspect ratio exceeding 10 and equal to or smaller than 30, which is included in the steels obtained by the method described above, and measured by using cross sections parallel to the rolling direction, is calculated by the following method. First, the steels were cut in a direction parallel to the rolling direction and the cut sections were polished. Then, enlarged images of the cut sections of the steels were captured with an optical microscope or an electron microscope. A magnification at this time was 100 times. By performing image analysis of the images, the number density of the Mn sulfides in the area, where the images are captured, was acquired. In addition, two Mn sulfides which were arranged in the extension direction and between which a gap of the ends thereof is equal to or smaller than 10 μm were considered as one extended Mn sulfide. Further, the capturing images and the analysis were repeated at least 10 times and the number density obtained by these operation was averaged. Accordingly, the average number density of the Mn sulfides in each of the steels, was acquired.

The total amounts of ferrite and pearlite included in the metallographic structure of the steels obtained by above-described method were acquired by cutting the steels, capturing photographs of a polished and etched cross section with light microscope, and performing image analysis of this photomicrograph. The above-described steps were repeated 4 times, and the average values of the obtained total amounts of ferrite and pearlite were assumed as the total amounts of ferrite and pearlite of the steels. As a result of the measurement, it was determined that 90 area % or more of the microstructure of all inventive steels were configured with ferrite and pearlite.

Figure 1A:
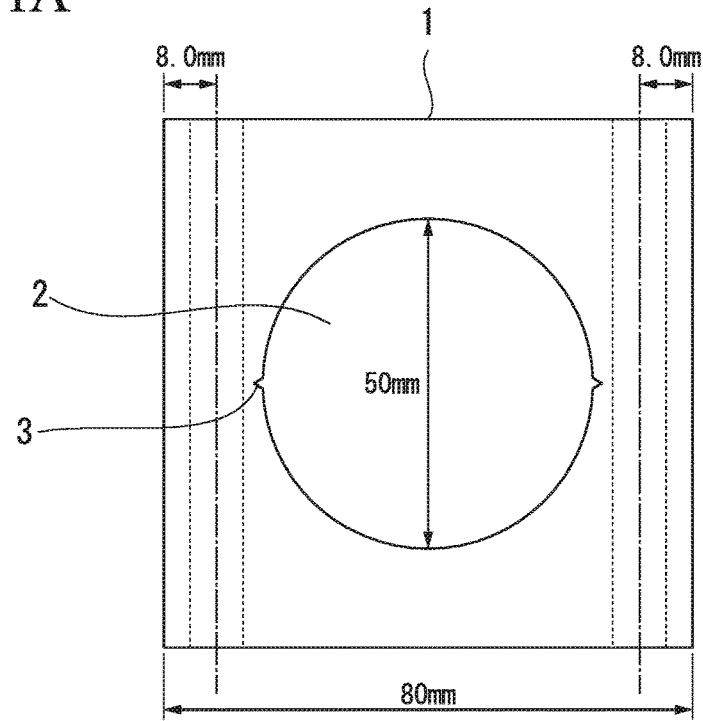
FIG. 1A is a plan view indicating a test piece for evaluation of fracture-split properties.
Figure 1B:
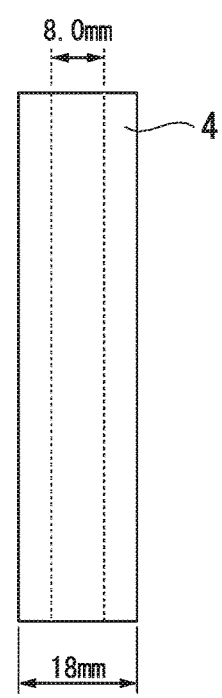
FIG. 1B is a side view indicating a test piece for evaluation of fracture-split properties.

Next, in order to check the fracture-split properties, test pieces corresponding to forged conrods were manufactured by hot forging. Specifically, the steels set to a material steel bar having a diameter of 56 mm and a length of 100 mm by the process described above was heated to 1,150° C. to 1,280° C., and the forging was performed in a direction perpendicular to a length direction of the steel bar to have a thickness of 20 mm. The forged steels were cooled to room temperature by air cooling (cooling by leaving the steel in the atmosphere) or blast cooling (cooling by sending wind to the test piece). The forged steel after the cooling was cut into a JIS No. 4 tensile test piece and a test piece for evaluation of fracture-split properties of a shape corresponding to a large end of a conrod. The JIS No. 4 tensile test piece was collected along a longitudinal direction at a position of 30 mm from a side surface of the forged steel. The test piece for evaluation of fracture-split properties had a plate shape having a size of 80 mm×80 mm and a thickness of 18 mm in which a hole having a diameter of 50 mm was made in a center part thereof, as shown in FIG. 1, and V-notch machining was performed with a depth of 1 mm, a front end curvature of 0.5 mm at 45 degrees, at two portions positioned at ±90 degrees with respect to the length direction of the steel bar which is a material before the forging, on the inner surface of the hole having a diameter of 50 mm. In addition, a penetration hole having a diameter of 8 mm was made so that the center line thereof is positioned at a part of 8 mm from the side surface on the notch machining side, as a bolt hole.

A test apparatus for the evaluation of the fracture-split properties is configured with split mold and falling weight test devices. The split mold has a shape obtained by splitting a cylinder having a diameter of 46.5 mm formed on a rectangular steel into two along a center line. One side is fixed and the other side moves on a rail. A wedge hole was made on mating surfaces of two semicylinders. At the time of a fracture test, a hole having a diameter of 50 mm of a test piece is inserted into a cylinder having a diameter of 46.5 mm of this split mold to apply a wedge, and installed on the falling weight. The mass of the falling weight is 200 kg and has a system of falling along a guide. When the falling weight falls, the wedge is hit, and the test piece is subjected to tensile fracture into two. In addition, the surrounding of the test piece is fixed by pressing the split mold, so that the test piece is not isolated from the split mold at the time of the fracture.

A measurement method of the area ratio ("brittle fracture area ratio") of the brittle fracture surface with respect to the fracture section was as follows. First, a steel was fractured at a falling weight height of 100 mm and a photomicrograph of the fracture surface was captured. By analyzing the photomicrograph according to a method of a typical fracture surface analysis, a region where a brittle fracture surface configured with a cleavage crack, a pseudo cleavage crack, or an intergranular crack was generated, was demarcated, and a percentage of the area of the region of the brittle fracture surface with respect to the area of the entire fracture surface was calculated.

A measurement method of the distortion amount generated due to the fracture and split ("distortion amount") was as follows. Bolting was performed by facing the test pieces after the fracture, and the difference between an inner diameter in the fracture direction and an inner diameter in a direction perpendicular to the fracture direction was measured. This difference was considered as the distortion amount generated due to the fracture and split.

A measurement method of the amount of chips generated on the fracture surfaces ("amount of chips") was as follows. After performing the measurement of the amount of the distortion described above, an operation of facing and bolting the fracture surfaces at a torque of 20 N·m to assemble the fracture surfaces and then, loosening the bolt to release the fracture surfaces, was repeated 10 times. The total weight of fragments dropped due to the operations was measured and the total weight was considered as the amount of chips generated on the fracture surfaces.

A steel having excellent fracture-split properties is a steel in which a fracture morphology of the fracture surface is brittle, the distortion amount in the vicinity of the fracture surface due to the fracture and split is small, and the amount of chips is small. The inventors determined that a steel in which the area ratio of the brittle fracture surface is equal to or greater than 98%, the distortion amount in the vicinity of the fracture surface is equal to or smaller than 100 µm, and the amount of generated chips is equal to or smaller than 1.0 mg, as a steel having excellent fracture-split properties.

A steel in which a fracture surface is formed, in which an average number density of cracks or recesses ("number of cracks in fracture surface direction"), in which an angle with respect to the direction parallel to the tensile stress exceeds 45 degrees, which are formed over a length equal to or longer than 80 µm and observed on the cross section parallel to the rolling direction, and in which a part of the cracks or the recesses are propagated to an inner portion of the steel component, is limited to be smaller than 3.0 pieces per 10 mm, was considered as a steel having excellent fracture-split properties. In order to increase fitting properties between the fracture surfaces, it is necessary that the sizes of the recesses and the protrusions of the fracture surfaces in the tensile direction (that is, the sizes of steps formed by the recesses and the protrusions) are great and the recesses and the protrusions are present at a high frequency. The inventors considered a sample in which a fracture surface is formed, in which an average number density of steps ("number of steps in tensile direction"), in which a difference in height towards a direction parallel to the tensile stress is equal to or greater than 80 µm and an angle with respect to the direction parallel to the tensile stress is equal to or smaller than 45 degrees, and which are observed on the cross section parallel to the rolling direction, is equal to or greater than 2.0 pieces per 10 mm, as a sample having high fitting properties.

The number density of each of the steps in the tensile direction and the cracks in the fracture surface direction of the fracture surface was measured by the following method. First, a test piece was cut in a direction along to the tensile direction to allow the observation of the shapes of the fracture surfaces in a direction perpendicular to the tensile direction. By observing the shapes of the fracture surfaces on the cut sections described above, recesses and protrusions in the tensile direction and recesses and protrusions in the fracture surface direction were observed. The cut sections were formed so as to include the center of the fracture surface. The observation was performed with an arbitrary 5 or more fields of view of the cut sections. At the time of the observation, the number density of steps in the tensile direction and cracks in the fracture direction per 10 mm, at each field of view, was respectively measured and an average values thereof were acquired.

As shown in Table 3, all of inventive examples, i.e. manufacturing Nos. 1 to 29 satisfied the above-described acceptability criterion, had excellent fracture-split properties, and had good fitting properties. In manufacturing Nos. 1 to 29, the number density of Mn sulfides satisfying the above-described definitions regarding equivalent circle diameter and aspect ratio was equal to or greater than 50 per 1 mm$^2$.

Meanwhile, in manufacturing Nos. 30 to 46, the amounts of one or more of C, Si, Mn, P, S, Cr, V, Zr, N, and Bi are out of the ranges of the invention as shown in Table 2. These do not satisfy the conditions of the invention due to the following reasons as shown in Table 4.

In manufacturing Nos. 30, 32, 36, 41, and 44, the amounts of C, Si, P, V, and N were smaller than the lower limits of the ranges of the invention. Accordingly, the amount of plastic deformation at the time of the fracture and split exceeded 100 µm, which is a condition for obtaining excellent fracture-split properties.

In manufacturing Nos. 31, 33, 35, and 37, the amounts of C, Si, Mn, and P exceeded the upper limits of the ranges of the present invention, respectively. Accordingly, the amount of chips generated at the time of the fracture and split exceeded 1.0 mg therein.

In manufacturing No. 34, the amount of Mn was smaller than the lower limit of the range of the present invention and a temperature at which the Mn sulfides formed was lower than proper temperature range. Accordingly, the amount of crystallizing Mn sulfides decreased and the amount of precipitating Mn sulfides increased. As a result, the number density of the Mn sulfides having an equivalent circle diameter of 1 to 5 µm was larger than the upper limit, cracks along with the tensile direction was easily separated, and growth of the steps in tensile direction were prevented. Therefore, the number of steps in tensile direction in the fracture surface was smaller than the requirement of the present invention.

In manufacturing No. 38, the amount of S exceeded the upper limit of the range of the present invention. Therefore, the amount of generated chips at the time of fracture exceeded 1.0 mg, and the amount of plastic deformation at the time of the fracture and split exceeded 100 µm, which is a condition for obtaining excellent fracture-split properties.

In manufacturing No. 39, the amount of S was smaller than the lower limit of the range of the invention. Accordingly, a volume ratio and a degree of elongation of Mn sulfide was in sufficient, and the numbers of recesses and protrusions were smaller than the conditions of the invention.

In manufacturing No. 40, the amount of Cr exceeded the upper limit of the range of the invention. Accordingly, the amount of plastic deformation at the time of the fracture and split exceeded 100 µm which is the condition for obtaining excellent fracture-split properties.

In manufacturing No. 42, Zr was not included, the Mn sulfides were dispersed to have coarse distribution, the number of recesses and protrusions of the fracture surfaces does not satisfy the conditions of the invention, and the amount of plastic deformation at the time of the fracture and split exceeded 100 µm which is the condition for obtaining excellent fracture-split properties.

In manufacturing No. 43, the amount of N exceeded the upper limit of the range of the invention. Accordingly, a large number of defects were generated in a stage of manufacturing the steel, that is, in stages of casting and hot rolling. Therefore, it was an example not suitable as a material for steel component.

In manufacturing No. 45, the amount of Bi was smaller than the lower limit of the range of the invention. Although the fracture-split properties of the manufacturing No. 45 was within a range of acceptance, the cutting machinability described below was poor.

In manufacturing No. 46, the amount of Bi exceeded the upper limit of the range of the invention. Accordingly, a large number of defects were generated in a stage of manufacturing the steel, that is, in stages of casting and hot rolling. Therefore, it was an example not suitable as a material for steel component.

Cutting machinability was evaluated based on cutting chip disposability evaluated by hot-forging the above-described hot-rolled steel having a diameter of 56 mm to set the diameter as 25 mm, cutting to set the length as 500 mm, and turning with NC lathe under a condition as described below.

Cutting chip disposability was evaluated by the following method. Cutting chips discharged during cutting machinability test for 10 seconds were taken out. The lengths of the cutting chips which were taken out were measured and 10 pieces of the longest cutting chips were selected. The total weight of the selected 10 pieces of the cutting chips was evaluated as "cutting chip weight". In a case in which the cutting chips were connected and lengthened so that the total number of the cutting chips was less than 10 pieces, ten times of an average weight of the cutting chips which were taken out was evaluated as the "cutting chip weight". For example, if the total number of the cutting chips was 7 pieces and the total weight thereof was 12.0 g, the cutting chip weight was calculated as 12.0 g×10 pieces/7 pieces=17.1 g.

Tip used for evaluation of cutting machinability is as follows.

Base material: P-20 type grade carbide
Coating: None
Turning conditions are as follows.
Peripheral speed: 150 m/min
Feeding: 0.2 mm/rev
Cutting depth: 0.4 mm
Lubrication: Using water-soluble cutting oil It was determined that a sample in which cutting chip weight was 15 g or less in each marks had excellent cutting chip disposability, and such sample was described as "GOOD" in Tables 3 and 4. It was determined that a sample in which cutting chip weight was more than 15 g had poor cutting chip disposability, and such sample was described as "BAD" in Tables 3 and 4. In steels including Bi in a range of the invention, the cutting chip weight was 15 g or less. On the other hand, in manufacturing Nos. 30 to 33 and No. 45 which did not include Bi, the cutting chip weight was more than 15 g and the cutting machinability was poor.

TABLE 1

| STEEL No. | CHEMICAL COMPOSITION (mass %, REMAINDER IS IRON AND IMPURITIES) | | | | | | | | | | | | | | NUMBER DENSITY OF Mn SULFIDES (number/mm$^2$) | REMARKS |
|---|---|---|---|---|---|---|---|---|---|---|---|---|---|---|---|---|
| | C | Si | Mn | P | S | Cr | V | Zr | N | Bi | Ti | Nb | Mg | REM | | |
| A | 0.37 | 0.7 | 0.75 | 0.030 | 0.07 | 0.15 | 0.33 | 0.0018 | 0.0120 | 0.0020 | — | — | — | — | 81 | INVEN- |
| B | 0.42 | 1.0 | 0.80 | 0.012 | 0.09 | 0.12 | 0.34 | 0.0020 | 0.0090 | 0.0003 | — | — | — | — | 153 | TIVE |
| C | 0.38 | 0.9 | 0.85 | 0.035 | 0.07 | 0.20 | 0.25 | 0.0018 | 0.0120 | 0.0023 | — | — | — | — | 105 | STEELS |
| D | 0.35 | 0.7 | 0.80 | 0.010 | 0.08 | 0.24 | 0.26 | 0.0020 | 0.0100 | 0.0030 | — | — | — | — | 121 | |
| E | 0.38 | 0.7 | 0.80 | 0.025 | 0.09 | 0.09 | 0.31 | 0.0019 | 0.0095 | 0.0015 | — | — | — | — | 177 | |
| F | 0.45 | 0.6 | 0.80 | 0.030 | 0.09 | 0.13 | 0.31 | 0.0020 | 0.0120 | 0.0002 | — | — | — | — | 133 | |
| G | 0.38 | 0.8 | 0.60 | 0.015 | 0.09 | 0.13 | 0.30 | 0.0018 | 0.0110 | 0.0030 | — | — | — | — | 195 | |
| H | 0.35 | 1.0 | 0.60 | 0.020 | 0.08 | 0.09 | 0.40 | 0.0023 | 0.0105 | 0.0050 | — | — | — | — | 182 | |
| I | 0.36 | 0.8 | 0.80 | 0.015 | 0.07 | 0.10 | 0.33 | 0.0025 | 0.0098 | 0.0030 | — | — | — | — | 98 | |
| J | 0.38 | 0.9 | 0.75 | 0.025 | 0.08 | 0.12 | 0.20 | 0.0009 | 0.0090 | 0.0028 | — | — | — | — | 138 | |
| K | 0.37 | 0.7 | 0.85 | 0.015 | 0.08 | 0.13 | 0.27 | 0.0004 | 0.0090 | 0.0016 | — | — | — | — | 142 | |
| L | 0.36 | 0.6 | 0.80 | 0.020 | 0.08 | 0.20 | 0.25 | 0.0016 | 0.0095 | 0.0045 | — | — | — | — | 155 | |
| M | 0.37 | 1.0 | 0.75 | 0.030 | 0.07 | 0.15 | 0.28 | 0.0015 | 0.0105 | 0.0010 | — | — | — | — | 109 | |
| N | 0.38 | 0.8 | 0.80 | 0.035 | 0.08 | 0.12 | 0.29 | 0.0012 | 0.0095 | 0.0015 | — | — | — | — | 163 | |
| O | 0.37 | 0.6 | 0.85 | 0.015 | 0.08 | 0.13 | 0.22 | 0.0020 | 0.0103 | 0.0029 | — | — | — | — | 147 | |
| P | 0.38 | 0.9 | 0.80 | 0.020 | 0.09 | 0.14 | 0.30 | 0.0009 | 0.0099 | 0.0015 | — | — | — | — | 181 | |
| Q | 0.35 | 1.0 | 0.80 | 0.030 | 0.08 | 0.09 | 0.31 | 0.0023 | 0.0099 | 0.0020 | — | — | — | — | 149 | |
| R | 0.37 | 0.8 | 0.80 | 0.023 | 0.09 | 0.15 | 0.24 | 0.0019 | 0.0095 | 0.0025 | 0.015 | — | — | — | 163 | |
| S | 0.36 | 1.0 | 0.80 | 0.020 | 0.08 | 0.20 | 0.32 | 0.0018 | 0.0102 | 0.0020 | — | 0.025 | — | — | 158 | |
| T | 0.36 | 0.9 | 0.80 | 0.018 | 0.07 | 0.15 | 0.30 | 0.0023 | 0.0108 | 0.0025 | — | — | 0.0005 | 0.0010 | 115 | |
| U | 0.36 | 0.8 | 0.85 | 0.013 | 0.08 | 0.13 | 0.30 | 0.0021 | 0.0089 | 0.0015 | 0.030 | 0.015 | — | — | 133 | |
| V | 0.36 | 0.8 | 0.75 | 0.018 | 0.08 | 0.14 | 0.31 | 0.0020 | 0.0099 | 0.0020 | — | 0.010 | 0.0015 | 0.0008 | 165 | |
| W | 0.37 | 0.9 | 0.80 | 0.015 | 0.09 | 0.11 | 0.31 | 0.0018 | 0.0103 | 0.0025 | 0.015 | — | 0.0010 | 0.0009 | 162 | |
| X | 0.36 | 0.8 | 0.80 | 0.016 | 0.09 | 0.13 | 0.26 | 0.0023 | 0.0108 | 0.0020 | 0.030 | 0.015 | — | — | 155 | |
| Y | 0.36 | 0.9 | 0.80 | 0.018 | 0.08 | 0.12 | 0.33 | 0.0029 | 0.0112 | 0.0015 | 0.015 | 0.015 | 0.0005 | 0.0010 | 129 | |
| Z | 0.36 | 1.0 | 0.80 | 0.012 | 0.08 | 0.15 | 0.29 | 0.0022 | 0.0109 | 0.0020 | 0.020 | 0.010 | 0.0008 | 0.0010 | 137 | |
| A1 | 0.38 | 0.9 | 0.85 | 0.015 | 0.08 | 0.14 | 0.30 | 0.0019 | 0.0094 | 0.0020 | 0.025 | 0.020 | — | 0.0009 | 119 | |
| B1 | 0.37 | 0.8 | 0.70 | 0.016 | 0.09 | 0.06 | 0.33 | 0.0023 | 0.0086 | 0.0020 | 0.030 | 0.016 | 0.0010 | 0.0008 | 179 | |
| C1 | 0.38 | 0.9 | 0.70 | 0.013 | 0.09 | 0.06 | 0.33 | 0.0046 | 0.0095 | 0.0025 | 0.020 | — | — | — | 168 | |

THE SYMBOL "—" INDICATES A VALUE LOWER THAN A LEVEL WHICH IS ASSUMED AS IMPURITY.

TABLE 2

| STEEL No. | CHEMICAL COMPOSITION (mass %, REMAINDER IS IRON AND IMPURITIES) | | | | | | | | | | | | | | NUMBER DENSITY OF Mn SULFIDES (number/ mm$^2$) | REMARKS |
|---|---|---|---|---|---|---|---|---|---|---|---|---|---|---|---|---|
| | C | Si | Mn | P | S | Cr | V | Zr | N | Bi | Ti | Nb | Mg | REM | | |
| D1 | <u>0.34</u> | 0.8 | 0.80 | 0.020 | 0.08 | 0.06 | 0.23 | 0.0020 | 0.0125 | — | — | — | — | — | 121 | COMPARATIVE EXAMPLES |
| E1 | <u>0.46</u> | 0.8 | 0.80 | 0.018 | 0.07 | 0.05 | 0.20 | 0.0015 | 0.0130 | — | 0.015 | 0.010 | 0.0006 | 0.0006 | 101 | |
| F1 | 0.40 | <u>0.5</u> | 0.75 | 0.020 | 0.08 | 0.10 | 0.25 | 0.0021 | 0.0115 | — | — | — | — | — | 147 | |
| G1 | 0.38 | <u>1.1</u> | 0.85 | 0.018 | 0.09 | 0.11 | 0.23 | 0.0014 | 0.0110 | — | — | — | — | — | 143 | |
| H1 | 0.37 | 0.8 | <u>0.55</u> | 0.013 | 0.07 | 0.12 | 0.30 | 0.0010 | 0.0117 | 0.0020 | 0.030 | 0.020 | 0.0010 | 0.0008 | <u>203</u> | |
| I1 | 0.39 | 0.9 | <u>0.95</u> | 0.016 | 0.08 | 0.08 | 0.25 | 0.0015 | 0.0095 | 0.0025 | — | — | — | — | 85 | |
| J1 | 0.40 | 0.8 | 0.80 | <u>0.009</u> | 0.08 | 0.07 | 0.28 | 0.0015 | 0.0099 | 0.0015 | — | — | — | — | 124 | |
| K1 | 0.42 | 0.7 | 0.85 | <u>0.037</u> | 0.07 | 0.21 | 0.25 | 0.0009 | 0.0139 | 0.0020 | — | 0.015 | — | — | 81 | |
| L1 | 0.39 | 0.7 | 0.85 | 0.030 | <u>0.11</u> | 0.15 | 0.30 | 0.0003 | 0.0088 | 0.0020 | — | — | — | — | 191 | |
| M1 | 0.39 | 0.6 | 0.90 | 0.025 | <u>0.04</u> | 0.18 | 0.29 | 0.0007 | 0.0123 | 0.0020 | — | — | — | — | <u>15</u> | |
| N1 | 0.40 | 0.8 | 0.80 | 0.020 | 0.09 | <u>0.30</u> | 0.28 | 0.0016 | 0.0148 | 0.0025 | 0.015 | 0.021 | 0.0015 | 0.0010 | 155 | |
| O1 | 0.38 | 0.7 | 0.75 | 0.021 | 0.10 | <u>0.27</u> | <u>0.19</u> | 0.0027 | 0.0129 | 0.0020 | — | — | — | — | 189 | |
| P1 | 0.39 | 1.0 | 0.85 | 0.015 | 0.08 | 0.25 | 0.21 | — | 0.0095 | 0.0025 | 0.024 | 0.030 | — | — | <u>45</u> | |
| Q1 | 0.39 | 0.8 | 0.90 | 0.019 | 0.07 | 0.20 | 0.24 | <u>0.0018</u> | <u>0.0170</u> | 0.0015 | 0.015 | 0.010 | — | — | 72 | |
| R1 | 0.38 | 0.8 | 0.70 | 0.023 | 0.08 | 0.19 | 0.27 | 0.0010 | <u>0.0045</u> | 0.0025 | — | — | — | — | 151 | |
| S1 | 0.38 | 0.9 | 0.85 | 0.013 | 0.09 | 0.15 | 0.25 | 0.0016 | 0.0102 | — | — | — | — | — | 136 | |
| T1 | 0.42 | 0.8 | 0.90 | 0.011 | 0.07 | 0.13 | 0.23 | 0.0014 | 0.0110 | <u>0.0095</u> | — | — | — | — | 61 | |

THE SYMBOL "—" INDICATES A VALUE LOWER THAN A LEVEL WHICH IS ASSUMED AS IMPURITY.
THE UNDERLINED VALUE IS OUT OF RANGE OF INVENTION.

TABLE 3

| MANU- FACTURING No. | STEEL No. | METHOD OF WORKING AND COOLING | NUMBER OF STEPS IN TENSILE DIRECTION | DISTORTION AMOUNT (μm) | BRITTLE FRACTURE AREA RATIO (%) | AMOUNT OF CHIPS (mg) | NUMBER OF CRACKS IN FRACTURE SURFACE DIRECTION | CUTTING MACHINABILITY | REMARKS |
|---|---|---|---|---|---|---|---|---|---|
| 1 | A | HOT FORGING AND AIR COOLING | 2.9 | 88 | 100 | 0.2 | 1.0 | GOOD | INVENTIVE EXAMPLE |
| 2 | B | HOT FORGING AND AIR COOLING | 4.0 | 56 | 100 | 0.5 | 1.8 | GOOD | |
| 3 | C | HOT FORGING AND AIR COOLING | 4.2 | 62 | 100 | 0.4 | 2.1 | GOOD | |
| 4 | D | HOT FORGING AND AIR COOLING | 3.5 | 91 | 100 | 0.5 | 1.6 | GOOD | |
| 5 | E | HOT FORGING AND AIR COOLING | 3.6 | 86 | 100 | 0.6 | 2.0 | GOOD | |
| 6 | F | HOT FORGING AND AIR COOLING | 3.2 | 79 | 100 | 0.4 | 1.9 | GOOD | |
| 7 | G | HOT FORGING AND AIR COOLING | 2.9 | 78 | 99 | 0.6 | 1.8 | GOOD | |
| 8 | H | HOT FORGING AND AIR COOLING | 3.9 | 91 | 100 | 0.6 | 2.7 | GOOD | |
| 9 | I | HOT FORGING AND AIR COOLING | 3.6 | 89 | 99 | 0.3 | 1.5 | GOOD | |
| 10 | J | HOT FORGING AND AIR COOLING | 3.8 | 83 | 100 | 0.6 | 2.0 | GOOD | |
| 11 | K | HOT FORGING AND AIR COOLING | 4.8 | 82 | 100 | 0.5 | 2.2 | GOOD | |
| 12 | L | HOT FORGING AND AIR COOLING | 4.9 | 75 | 99 | 0.8 | 2.6 | GOOD | |
| 13 | M | HOT FORGING AND AIR COOLING | 4.1 | 45 | 100 | 0.9 | 2.9 | GOOD | |
| 14 | N | HOT FORGING AND AIR COOLING | 4.6 | 85 | 100 | 0.8 | 1.8 | GOOD | |
| 15 | O | HOT FORGING AND AIR COOLING | 4.2 | 80 | 100 | 0.8 | 1.4 | GOOD | |
| 16 | P | HOT FORGING AND AIR COOLING | 4.6 | 71 | 100 | 0.6 | 2.1 | GOOD | |
| 17 | Q | HOT FORGING AND AIR COOLING | 2.4 | 80 | 99 | 0.4 | 2.3 | GOOD | |
| 18 | R | HOT FORGING AND AIR COOLING | 3.2 | 76 | 100 | 0.4 | 1.6 | GOOD | |
| 19 | S | HOT FORGING AND AIR COOLING | 2.8 | 66 | 100 | 0.5 | 1.9 | GOOD | |
| 20 | T | HOT FORGING AND AIR COOLING | 3.2 | 92 | 100 | 0.6 | 2.2 | GOOD | |

TABLE 3-continued

| MANU-FACTURING No. | STEEL No. | METHOD OF WORKING AND COOLING | NUMBER OF STEPS IN TENSILE DIRECTION | DISTORTION AMOUNT (μm) | BRITTLE FRACTURE AREA RATIO (%) | AMOUNT OF CHIPS (mg) | NUMBER OF CRACKS IN FRACTURE SURFACE DIRECTION | CUTTING MACHINABILITY | REMARKS |
|---|---|---|---|---|---|---|---|---|---|
| 21 | U | HOT FORGING AND AIR COOLING | 2.3 | 29 | 100 | 0.4 | 1.5 | GOOD | |
| 22 | V | HOT FORGING AND AIR COOLING | 3.5 | 58 | 100 | 0.4 | 1.8 | GOOD | |
| 23 | W | HOT FORGING AND AIR COOLING | 2.5 | 51 | 100 | 0.5 | 1.6 | GOOD | |
| 24 | X | HOT FORGING AND AIR COOLING | 2.5 | 41 | 100 | 0.3 | 1.3 | GOOD | |
| 25 | Y | HOT FORGING AND AIR COOLING | 2.1 | 36 | 100 | 0.4 | 1.5 | GOOD | |
| 26 | Z | HOT FORGING AND AIR COOLING | 2.3 | 51 | 100 | 0.3 | 1.6 | GOOD | |
| 27 | A1 | HOT FORGING AND AIR COOLING | 2.5 | 38 | 100 | 0.3 | 1.2 | GOOD | |
| 28 | B1 | HOT FORGING AND BLAST COOLING | 2.1 | 31 | 100 | 0.2 | 1.8 | GOOD | |
| 29 | C1 | HOT FORGING AND AIR COOLING | 2.3 | 29 | 100 | 0.3 | 1.5 | GOOD | |

TABLE 4

| MANU-FACTURING No. | STEEL No. | METHOD OF WORKING AND COOLING | NUMBER OF STEPS IN TENSILE DIRECTION | DISTORTION AMOUNT (μm) | BRITTLE FRACTURE AREA RATIO (%) | AMOUNT OF CHIPS (mg) | NUMBER OF CRACKS IN FRACTURE SURFACE DIRECTION | CUTTING MACHINABILITY | REMARKS |
|---|---|---|---|---|---|---|---|---|---|
| 30 | D1 | HOT FORGING AND AIR COOLING | 2.2 | 160 | 95 | 0.2 | 0.6 | BAD | COMPARATIVE EXAMPLE |
| 31 | E1 | HOT FORGING AND AIR COOLING | 5.4 | 44 | 100 | 1.1 | 2.4 | BAD | |
| 32 | F1 | HOT FORGING AND AIR COOLING | 3.2 | 130 | 97 | 0.4 | 1.2 | BAD | |
| 33 | G1 | HOT FORGING AND AIR COOLING | 5.8 | 50 | 100 | 1.5 | 3.2 | BAD | |
| 34 | H1 | HOT FORGING AND AIR COOLING | 1.2 | 46 | 99 | 0.2 | 0.6 | GOOD | |
| 35 | I1 | HOT FORGING AND AIR COOLING | 2.9 | 48 | 100 | 1.1 | 3.2 | GOOD | |
| 36 | J1 | HOT FORGING AND AIR COOLING | 3.2 | 123 | 92 | 0.8 | 1.6 | GOOD | |
| 37 | K1 | HOT FORGING AND AIR COOLING | 2.6 | 56 | 100 | 1.5 | 3.9 | GOOD | |
| 38 | L1 | HOT FORGING AND AIR COOLING | 4.8 | 108 | 100 | 1.3 | 3.2 | GOOD | |
| 39 | M1 | HOT FORGING AND AIR COOLING | 1.7 | 95 | 99 | 0.7 | 1.6 | GOOD | |
| 40 | N1 | HOT FORGING AND AIR COOLING | 2.1 | 119 | 96 | 0.4 | 1.3 | GOOD | |
| 41 | O1 | HOT FORGING AND AIR COOLING | 2.6 | 111 | 97 | 0.5 | 1.6 | GOOD | |
| 42 | P1 | HOT FORGING AND AIR COOLING | 1.7 | 121 | 95 | 0.6 | 1.5 | GOOD | |
| 43 | Q1 | HOT FORGING AND AIR COOLING | EVALUATION WAS NOT PERFORMED DUE TO OCCURRING LARGE NUMBER OF DEFECTS. IT IS ASSUMED AS POOR MATERIAL. | | | | | | |
| 44 | R1 | HOT FORGING AND AIR COOLING | 2.6 | 109 | 97 | 0.5 | 1.2 | GOOD | |
| 45 | S1 | HOT FORGING AND AIR COOLING | 4.3 | 62 | 100 | 0.9 | 2.7 | BAD | |
| 46 | T1 | HOT FORGING AND AIR COOLING | EVALUATION WAS NOT PERFORMED DUE TO OCCURRING LARGE NUMBER OF DEFECTS. IT IS ASSUMED AS POOR MATERIAL. | | | | | | |

Example 2

Steels A-2 to A-4 having the same chemical compositions as those of the steel A shown in Table 1 were manufactured under the conditions shown in Table 5, and the average number density of Mn sulfides ("Number density of Mn sulfides") satisfying definitions regarding equivalent circle diameter and aspect ratio of the invention included in these steels was measured. In Table 5, the "time until Zr input" is a time (min) until Zr input from the start of the degassing treatment, the "total reduction of area" is the total reduction of area (%) of the hot rolling, the "reduction of area within a temperature equal to or lower than 1,000° C." is the total reduction of area (%) within a period in which a temperature of the steel is equal to or lower than 1,000° C., in the hot rolling, and the "number density of Mn sulfides" is the number density (number/mm$^2$) of Mn sulfides having an aspect ratio exceeding 10 and equal to or smaller than 30. The manufacturing conditions not shown in Table 3 were set to be the same as those in manufacturing Nos. 1 to 46.

TABLE 5

| | | ROLLING | | |
|---|---|---|---|---|
| STEEL No. | MELTING TIME UNTIL Zr INPUT (min) | TOTAL REDUCTION OF AREA (%) | REDUCTION OF AREA WITHIN A TEMPERATURE EQUAL TO OR LOWER THAN 1,000° C. (%) | NUMBER DENSITY OF Mn SULFIDES (number/mm$^2$) |
| A-2 | 25 | 85 | 52 | <u>48</u> |
| A-3 | 15 | 70 | 53 | <u>48</u> |
| A-4 | 14 | 85 | 45 | <u>46</u> |

As shown in Table 1, regarding the steel A, all of the chemical compositions and the manufacturing conditions were within the range of the invention. Accordingly, the number density of the Mn sulfides was within the range of the invention. On the other hand, as shown in Table 5, regarding the steels A-2 to A-4, the chemical compositions were within the range of the invention, but the manufacturing conditions were out of the range of the invention. Accordingly, the number density of the Mn sulfides was smaller than the range of the invention.

The steel A-2 is an example in which Zr was added after more than 15 minutes was elapsed from the start of the degassing treatment. The time for sufficiently refining the Mn sulfides by using the Zr oxides was not ensured. Accordingly, it is assumed that the number density of the Mn sulfides was not sufficient in the steel A-2.

The steel A-3 is an example in which the total reduction of area during hot rolling was smaller than 80%, and the steel A-4 is an example in which the reduction of area in a temperature range equal to or lower than 1,000° C. which was a temperature range in which the Mn sulfides are easily extended, was smaller than 50%. The Mn sulfides were not sufficiently extended at the time of the hot rolling. Accordingly, it is assumed that the number density of the Mn sulfides was not sufficient, in the steels A-3 and A-4.

INDUSTRIAL APPLICABILITY

In a case in which the hot-rolled steel of the embodiment is hot-forged, air-cooled or blast-cooled, and then fractured and split, the hot-rolled steel has a small amount of plastic deformation in the vicinity of a fracture surface and a small amount of chips, that is, the hot-rolled steel has an excellent fracture-split properties. In the hot-rolled steel and the steel component of the embodiment, due to characteristics in which the amount of plastic deformation of a fracture surface is small and the amount of chips is decreased, the fracture surfaces can be fit at excellent accuracy without position displacement at the time of fitting of the fracture surfaces, and it is possible to realize the improvement of yield. In addition, in the hot-rolled steel and the steel component of the embodiment, due to the above-described characteristics, shaking chips off can be omitted, and a manufacturing cost can be reduced. Thus, it is greatly effective in improving economic efficiency in industry. Moreover, the component manufactured by hot-forging the hot-rolled steel of the embodiment has excellent cutting machinability, and thus, working efficiency at manufacturing the component is improved and productivity is enhanced.

BRIEF DESCRIPTION OF THE REFERENCE SYMBOLS

1: test piece
2: hole
3: V notch
4: penetration hole
10: steel component
11: Mn sulfide
12: crack
21: crack in fracture surface direction
22: step in tensile direction

The invention claimed is:
1. A hot-rolled steel,
wherein a chemical composition comprises:
C: 0.35 to 0.45 mass %,
Si: 0.6 to 1.0 mass %,
Mn: 0.60 to 0.90 mass %,
P: 0.010 to 0.035 mass %,
S: 0.06 to 0.10 mass %,
Cr: 0.25 mass % or less,
V: 0.20 to 0.40 mass %,
Zr: 0.0002 to 0.0050 mass %,
N: 0.0060 to 0.0150 mass %,
Bi: 0.0001 to 0.0050 mass %,
Ti: 0 to 0.050 mass %,
Nb: 0 to 0.030 mass %,
Mg: 0 to 0.0050 mass %,
REM: 0 to 0.0010 mass %, and
a remainder including iron and impurities,
90 area % or more of a metallographic structure is configured with a ferrite and a pearlite, and
an average number density of Mn sulfides having an equivalent circle diameter of 1 to 5 μm, extending along a rolling direction, and having an aspect ratio exceeding 10 and equal to or smaller than 30, which is measured on a cross section parallel to the rolling direction, is 50 to 200 number/mm$^2$.

2. The hot-rolled steel according to claim 1,
wherein the chemical composition includes one or more elements selected from the group consisting of
Ti: 0.005 to 0.050 mass %,
Nb: 0.005 to 0.030 mass %,
Mg: 0.0005 to 0.0050 mass %, and
REM: 0.0003 to 0.0010 mass %.

3. A steel component,
wherein a chemical composition comprises:
C: 0.35 to 0.45 mass %,
Si: 0.6 to 1.0 mass %,
Mn: 0.60 to 0.90 mass %,
P: 0.010 to 0.035 mass %,
S: 0.06 to 0.10 mass %,
Cr: 0.25 mass % or less,
V: 0.20 to 0.40 mass %,
Zr: 0.0002 to 0.0050 mass %,
N: 0.0060 to 0.0150 mass %,
Bi: 0.0001 to 0.0050 mass %,
Ti: 0 to 0.050 mass %,
Nb: 0 to 0.030 mass %,
Mg: 0 to 0.0050 mass %,
REM: 0 to 0.0010 mass %, and
a remainder including iron and impurities,
90 area % or more of a metallographic structure is configured with a ferrite and a pearlite, and
an average number density of Mn sulfides having an equivalent circle diameter of 1 to 5 μm, extending along a rolling direction, having an aspect ratio exceeding 10 and equal to or smaller than 30, which is measured on a cross section parallel to the rolling direction, is 50 to 200 number/mm$^2$.

4. The steel component according to claim 3,
wherein, in a case where tensile fracture of the steel component is performed by tensile stress parallel to the rolling direction to form fracture surfaces,
steps, in which a difference in height towards a direction parallel to the tensile stress is equal to or greater than 80 μm and an angle with respect to the direction parallel to the tensile stress is equal to or smaller than 45 degrees, and which are observed on the cross section parallel to the rolling direction, are formed on the fracture surface at an average number density of equal to or greater than 2.0 pieces per 10 mm,
a brittle fracture surface is 98 area % or more with respect to the fracture surface, and
an average number density of cracks or recesses, in which an angle with respect to the direction parallel to the tensile stress exceeds 45 degrees, which are formed over a length equal to or longer than 80 μm and observed on the cross section parallel to the rolling direction, and in which a part of the cracks or the recesses are propagated to an inner portion of the steel component, is smaller than 3.0 pieces per 10 mm on the fracture surface.

5. The steel component according to claim 3,
wherein the chemical composition includes one or more elements selected from the group consisting of
Ti: 0.005 to 0.050 mass %,
Nb: 0.005 to 0.030 mass %,
Mg: 0.0005 to 0.0050 mass %, and
REM: 0.0003 to 0.0010 mass %.

6. The steel component according to claim 4,
wherein the chemical composition includes one or more elements selected from the group consisting of
Ti: 0.005 to 0.050 mass %,
Nb: 0.005 to 0.030 mass %,
Mg: 0.0005 to 0.0050 mass %, and
REM: 0.0003 to 0.0010 mass %.

\* \* \* \* \*